(12) United States Patent
Higuchi

(10) Patent No.: US 8,872,617 B2
(45) Date of Patent: Oct. 28, 2014

(54) DATA-PROCESSING DEVICE AND DATA-PROCESSING PROGRAM WITH BIO-AUTHORIZATION FUNCTION

(75) Inventor: Takeshi Higuchi, Daito (JP)

(73) Assignee: KYOCERA Corporation, Kyoto (JP)

( * ) Notice: Subject to any disclaimer, the term of this patent is extended or adjusted under 35 U.S.C. 154(b) by 348 days.

(21) Appl. No.: 13/203,448

(22) PCT Filed: Feb. 24, 2010

(86) PCT No.: PCT/JP2010/001260
§ 371 (c)(1),
(2), (4) Date: Aug. 25, 2011

(87) PCT Pub. No.: WO2010/098094
PCT Pub. Date: Sep. 2, 2010

(65) Prior Publication Data
US 2011/0310044 A1    Dec. 22, 2011

(30) Foreign Application Priority Data
Feb. 25, 2009    (JP) .................................. 2009-042283

(51) Int. Cl.
*G06F 3/048* (2013.01)
*G06F 1/16* (2006.01)
*G06F 21/62* (2013.01)
*G06F 21/32* (2013.01)

(52) U.S. Cl.
CPC ............ *G06F 1/1696* (2013.01); *G06F 21/629* (2013.01); *G06F 21/32* (2013.01); *G06F 1/1684* (2013.01)
USPC ......................................... 340/5.1; 345/173

(58) Field of Classification Search
CPC ........................................................ G06F 3/048
USPC .......................................................... 345/173
See application file for complete search history.

(56) References Cited

U.S. PATENT DOCUMENTS 6,636,144 B1    10/2003    Hirakawa
6,965,376 B2 *  11/2005    Tani et al. ..................... 345/173
(Continued)

FOREIGN PATENT DOCUMENTS

JP    H11-161582 A    6/1999
JP    H11-250521 A    9/1999
(Continued)

OTHER PUBLICATIONS

Machine translation to English of Japanese patent publication No. 2005-182119, published Jul. 7, 2005.*

(Continued)

*Primary Examiner* — Quan-Zhen Wang
*Assistant Examiner* — David Lee
(74) *Attorney, Agent, or Firm* — Procopio, Cory, Hargreaves & Savitch LLP

(57) ABSTRACT

A data processing device comprising: a storage unit storing therein a correspondence table in which biometric data pieces are associated one-to-one with different jobs, the biometric data pieces pertaining to respective fingers of a user; a display unit; a designation unit operable to, in accordance with a user operation, designate a target data piece from among data pieces being displayed on the display unit; a generation unit operable to generate a biometric data piece by reading a biometric information piece of a finger of the user; and an execution unit operable to execute one of the different jobs that is associated with one of the stored biometric data pieces that matches the generated biometric data piece by using the target data piece as data input by the user with respect to the one of the different jobs.

15 Claims, 19 Drawing Sheets

(56) References Cited

U.S. PATENT DOCUMENTS

| | | | |
|---|---|---|---|
| 8,185,543 B1* | 5/2012 | Choudhry et al. | 707/767 |
| 2008/0158170 A1* | 7/2008 | Herz et al. | 345/173 |
| 2008/0229249 A1* | 9/2008 | Lau et al. | 715/840 |
| 2008/0319990 A1* | 12/2008 | Taranenko et al. | 707/5 |

FOREIGN PATENT DOCUMENTS

| | | |
|---|---|---|
| JP | H11-327727 A | 11/1999 |
| JP | 2000-222522 A | 8/2000 |
| JP | 2000-270385 A | 9/2000 |
| JP | 2000-311040 A | 11/2000 |
| JP | 2002-304256 A | 10/2002 |
| JP | 2002-373137 A | 12/2002 |
| JP | 2002-374346 A | 12/2002 |
| JP | 2005-182119 A | 7/2005 |
| JP | 2005-268951 A | 9/2005 |
| JP | 2007-318423 A | 12/2007 |

OTHER PUBLICATIONS

International Search Report dated Mar. 30, 2010 issued by the Japanese Patent Office for International Application No. PCT/JP2010/001260.

* cited by examiner

FIG. 2

| Fingerprint data | Application |
|---|---|
| Right thumb | Mail application |
| Right index finger | Map application |
| Right middle finger | Video application |

FIG. 9

| Fingerprint data | Function |
|---|---|
| Left thumb | Creation of reply mail |
| Left index finger | Search for received mail |

DATA-PROCESSING DEVICE AND DATA-PROCESSING PROGRAM WITH BIO-AUTHORIZATION FUNCTION

TECHNICAL FIELD

The present invention relates to a data processing device with biometric authentication functions, and in particular to improvement in usability upon calling and executing a given function of the data processing device in accordance with biometric information of a user's finger.

BACKGROUND ART

In recent years, data processing devices, represented herein by mobile telephones, have started to incorporate biometric authentication functions to preserve security and improve usability. For example, a mobile telephone described in Patent Literature 1 stores therein, as biometric information, pieces of fingerprint data pertaining to respective fingers of a user in one-to-one association with different applications (e.g., a camera function and an infrared communication function). According to Patent Literature 1, when the user runs one of his/her fingers over a fingerprint sensor, the mobile telephone compares fingerprint data authenticated by the fingerprint sensor (hereinafter referred to as "authenticated fingerprint data") with each of the stored pieces of fingerprint data, and activates an application associated with one of the stored pieces of fingerprint data that matches the authenticated fingerprint data.

The above configuration allows the user to easily activate a desired application simply by having a fingerprint authentication sensor authenticate one of his/her fingers that is associated with the desired application, without performing cumbersome operations to activate the desired application.

CITATION LIST

Patent Literature

[Patent Literature 1]
  JP Patent Application Publication No. 2005-268951

SUMMARY OF INVENTION

Technical Problem

There are occasions when a user wishes to use multiple applications in succession. One example is when the user wishes to look for an address shown in the text of a received mail using a map search application. In this case, the user first activates a mail application by having a fingerprint authentication sensor authenticate one of his/her fingers that is associated with the mail application. Once the mail application has been activated, the user copies the address shown in the text of the received mail. Thereafter, the user activates the map search application by having the fingerprint authentication sensor authenticate one of his/her fingers that is associated with the map search application. The user then pastes the copied address into a search box and executes the search.

As described above, although the user can easily activate each one of the applications by having the fingerprint authentication sensor authenticate a corresponding finger, the user is required to perform conventional cumbersome operations to copy the address and paste the copied address into the search box.

Another example is when the user wishes to cite a predetermined character string shown in the text of the received mail in a reply mail. In this case, the user first activates a mail application by having the fingerprint authentication sensor authenticate one of his/her fingers that is associated with a mail application. Once the mail application has been activated, the user copies the predetermined character string shown in the text of the received mail. Thereafter, the user makes the mobile telephone display a screen for creating a reply mail, and pastes the copied character string into the text displayed on that screen.

As described above, the user is required to perform a conventional cumbersome operation to copy the predetermined character string into the reply mail, not only when using multiple applications in succession, but also when using a single application. Many users have been demanding further improvement in the usability of functions of mobile telephones.

Although the above-described problem is associated with mobile telephones, the same problem occurs in personal digital assistants (PDAs), personal communicators, and the like. That is to say, the above-described problem is not unique to mobile telephones but is common to any data processing device that calls and executes a given function in accordance with biometric information.

The present invention aims to provide a data processing device that offers improved usability upon calling and executing a given function in accordance with biometric authentication.

Solution to Problem

In order to solve the above problem, a data processing device pertaining to one embodiment of the present invention comprises: a storage unit storing therein a correspondence table in which biometric data pieces are associated one-to-one with different jobs, the biometric data pieces pertaining to respective fingers of a user; a display unit; a designation unit operable to, in accordance with a user operation, designate a target data piece from among data pieces being displayed on the display unit; a generation unit operable to generate a biometric data piece by reading a biometric information piece of a finger of the user; and an execution unit operable to execute one of the different jobs that is associated with one of the stored biometric data pieces that matches the generated biometric data piece by using the target data piece as data input by the user with respect to the one of the different jobs.

Advantageous Effects of Invention

With the above structure, the user of the data processing device can have the data processing device read biometric information associated with a desired job. Accordingly, the data processing device can execute the desired job by using the selected data as data input by the user to the desired job.

BRIEF DESCRIPTION OF DRAWINGS

FIG. 2 shows a fingerprint-application correspondence table.

FIG. 9 shows a fingerprint-function correspondence table.

DESCRIPTION OF EMBODIMENTS

The following describes a mobile telephone 10, which is one embodiment of a data processing device pertaining to the present invention, with reference to the accompanying drawings.

Embodiment 1

1.1 Structure of Mobile Telephone 10

Figure 1:
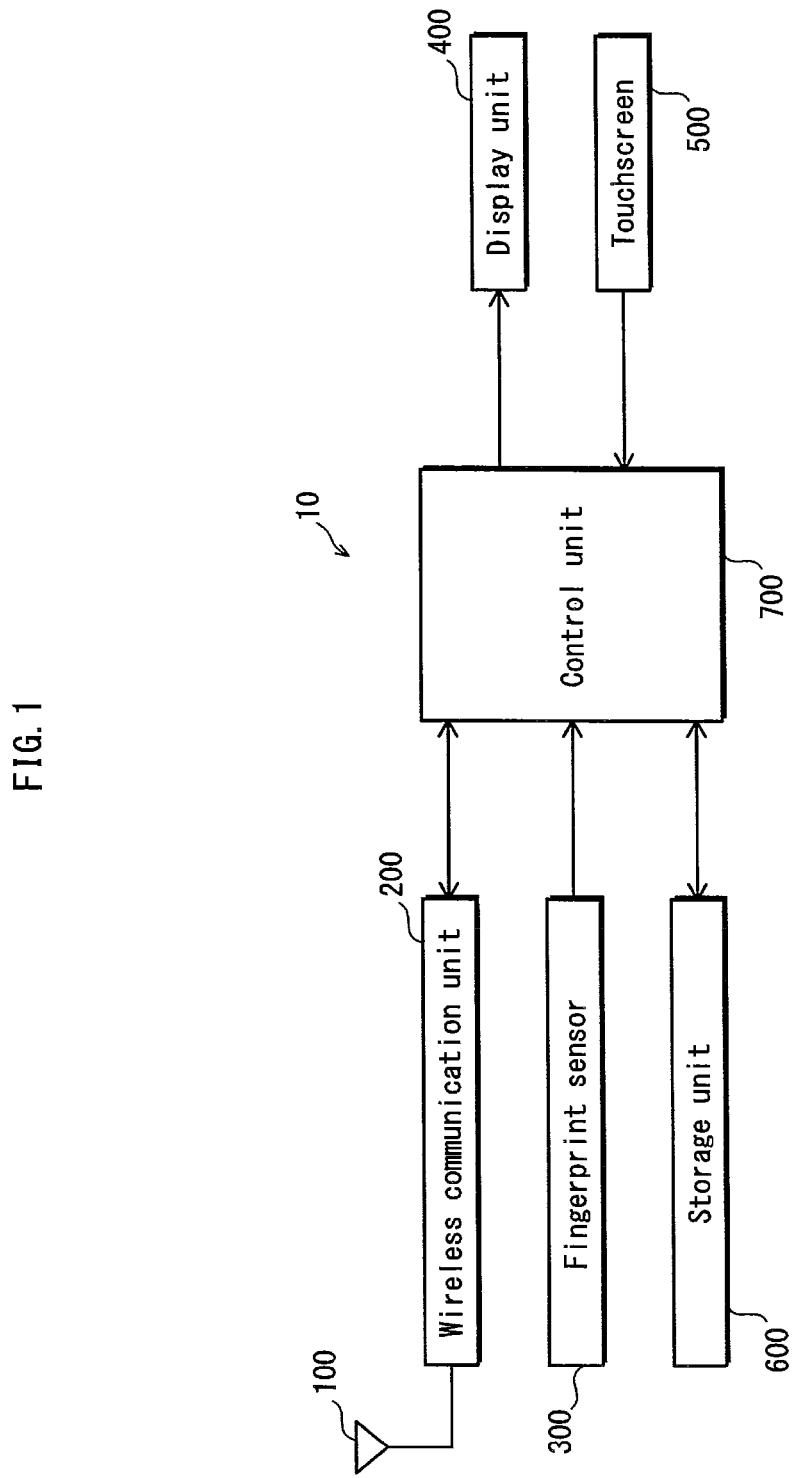
FIG. 1 is a block diagram showing the structure of a mobile telephone 10 pertaining to Embodiment 1.

FIG. 1 is a block diagram showing the structure of the mobile telephone 10. As shown in FIG. 1, the mobile telephone 10 is composed of a wireless communication unit 200 connected to an antenna 100, a fingerprint sensor 300, a display unit 400, a touchscreen 500, a storage unit 600, and a control unit 700.

The wireless communication unit 200 is a circuit for controlling wireless communication processing, such as demodulation processing on a signal received via the antenna 100, and modulation processing on a signal transmitted via the antenna 100.

The fingerprint sensor 300 reads a user's fingerprint, generates fingerprint data containing characteristics of the read fingerprint, and transmits the generated fingerprint data to the control unit 700. It should be noted here that characteristics of a fingerprint include the end points of friction ridges, the directions in which the friction ridges branch out, and the positional relationships among the friction ridges.

The display unit 400 is composed of, for example, a liquid crystal display (LCD) and a backlight unit, and displays various types of screen information generated by the control unit 700.

The touchscreen 500 is a position input device that is disposed to cover an entirety of the upper surface of the LCD. When the user presses the touchscreen 500 with his/her finger, the touchscreen 500 detects position information corresponding to the pressed position and transmits the detected position information to the control unit 700. Note that the present embodiment is described under the assumption that data to be input to an application to be newly activated (hereinafter also referred to as "activation-target application") is designated by the user running his/her finger over a character string displayed on the touchscreen. Such data to be input is hereinafter also referred to as "input data", and is considered as data input by the user to the application to be newly activated. The input data can be designated simply by the user running his/her finger over a character string. Therefore, when the application to be newly activated is, for example, a search application, the user need not perform cumbersome operations (e.g., separately inputting search criteria) after the search application is activated. Here, the user slides his/her finger over the touchscreen 500 with that finger being in contact with the touchscreen 500. Therefore, at a predetermined time interval, the touchscreen 500 detects position information corresponding to the portion of the touchscreen 500 that is currently being touched by the sliding finger, and transmits the detected position information to the control unit 700.

The storage unit 600 stores therein pieces of data necessary for the mobile telephone 10 to perform various types of processing, various types of control programs, a plurality of general application programs, and the like. Examples of the storage unit 600 include memory such as read only memory (ROM) and random access memory (RAM). For example, the storage unit 600 stores therein the following application programs: a mail application for creating and transmitting/receiving a mail; a map application for searching for a map and the like; and a video application for playing back video.

The storage unit 600 also stores therein a fingerprint-application correspondence table. In the fingerprint-application correspondence table are written a plurality of pairs of (i) fingerprint data of a user's finger and (ii) an application stored in the storage unit 600. FIG. 2 shows the fingerprint-application correspondence table. As shown in FIG. 2, pieces of fingerprint data for respective fingers of the user are in one-to-one association with different applications. The fingerprint-application correspondence table is generated as a result of execution of registration processing, which will be described later.

Figure 3:
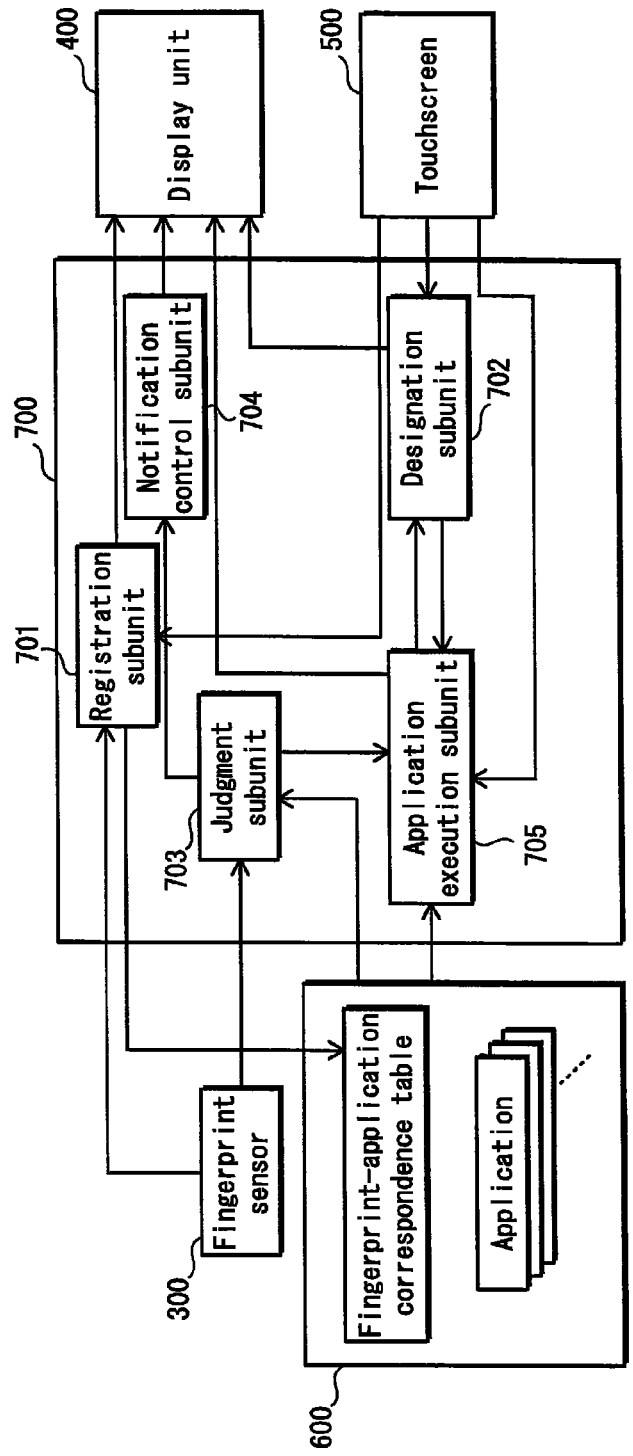
FIG. 3 is a block diagram showing a detailed structure of a control unit 700.

The control unit 700, or specifically a central processing unit (CPU), executes various functions of the mobile telephone 10 by executing respective programs stored in the ROM. FIG. 3 shows a detailed structure of the control unit 700. Main processing performed by the control unit 700 includes registration processing for registering the fingerprint-application correspondence table, and inter-application link processing for executing an application with use of a character string that is designated in accordance with a user operation. As shown in FIG. 3, the control unit 700 is composed of a registration subunit 701, a designation subunit 702, a judgment subunit 703, a notification control subunit 704, and an application execution subunit 705. Specifically, each of these subunits 701 to 705 is realized by being written by a computer program. The following is a detailed explanation of functions of the control unit 700.

The registration subunit 701 selects an application to be registered with the fingerprint-application correspondence table in accordance with an input operation made by the user via the touchscreen 500, and stores the selected application in the storage unit 600 in association with fingerprint data input from the fingerprint sensor 300.

The designation subunit 702 acquires position information pertaining to the input operation made by the user via the touchscreen 500. The designation subunit 702 also acquires arrangement information of display data that is being displayed on the LCD from the application execution subunit 705, and based on the acquired position information and arrangement information, designates a character string corresponding to a position on the display data as indicated by the position information (hereinafter also referred to as "designated character string"). The designated character string is transmitted to the application execution subunit 705. Note that the arrangement information shows character strings, still images, and the like that constitute the screen being displayed on the LCD, as well as pieces of position information of such character strings, still images, and the like.

The judgment subunit 703 compares fingerprint data input from the fingerprint sensor 300 (hereinafter referred to as "authenticated fingerprint data") with each piece of fingerprint data in the fingerprint-application correspondence table stored in the storage unit 600. After the comparison, the judgment subunit 703 notifies the application execution subunit 705 of information indicating the application associated with one of the pieces of fingerprint data that matches the authenticated fingerprint data. By way of example, the fingerprint data that matches the authenticated fingerprint data contains fingerprint characteristics that match fingerprint characteristics contained in the authenticated fingerprint data at a match rate of 80% or higher.

Furthermore, when the authenticated fingerprint data matches one of the pieces of fingerprint data in the fingerprint-application correspondence table at a predetermined match rate (e.g., 80%) or higher, the judgment subunit 703 notifies the notification control subunit 704 of information for identifying an application corresponding to the stated one of the pieces of fingerprint data (e.g., the name of the application).

The notification control subunit 704 displays the information for identifying the application, which is input from the judgment subunit 703, on the LCD.

The application execution subunit 705 activates the application in accordance with the information notified by the judgment subunit 703 or the input operation made by the user via the touchscreen 500, and displays data relating to the activated application on the LCD. Upon newly receiving a notification regarding another application from the judgment subunit 703 while displaying the data relating to the activated application on the LCD, the application execution subunit 705 activates said another application, executes said another application by using the designated character string designated by the designation subunit 702, and displays a result of the execution on the LCD.

Note that the mobile telephone 10 is generally equipped with other devices such as a microphone for audio input and a speaker for audio output. However, these devices are not described herein in detail as they bear no relation to the present embodiment. These devices may be structured the same as those of conventional mobile telephones.

1.2 Operations of Mobile Telephone 10

A description is now given of the operations of the mobile telephone 10.

Figure 4:
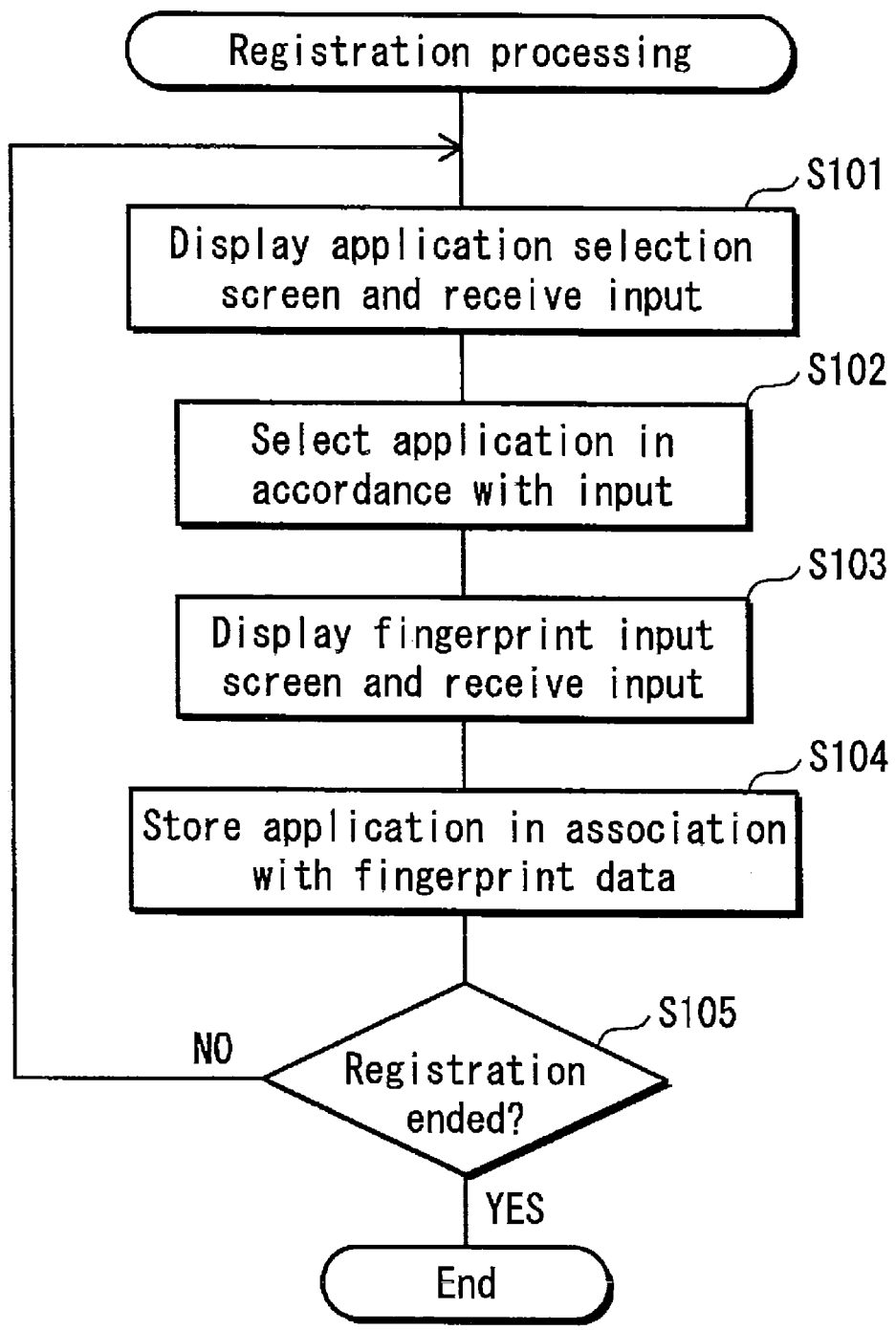
FIG. 4 is a flowchart of registration processing.

1.2.1 Registration Processing for Fingerprint-Application Correspondence Table First, the following describes registration processing for the fingerprint-application correspondence table, which is performed by the mobile telephone 10. By performing this registration processing, the fingerprint-application correspondence table is generated, and an application can be activated on the mobile telephone 10 in accordance with fingerprint data. FIG. 4 is a flowchart of the registration processing.

When a certain operation including password input is performed, the registration subunit 701 of the mobile telephone 10 displays, on the LCD, an application selection screen to encourage the user to select an application, and receives input via the touchscreen 500 (step S101). The registration subunit 701 then selects the application to be registered in accordance with the received input (step S102). The above selection according to the received input is made by, for example, displaying a list of applications on the LCD and receiving the user input designating one of the applications.

After selecting the application, the registration subunit 701 displays, on the LCD, a fingerprint input screen to encourage the user to input his/her fingerprint, and when the user slides his/her finger over the fingerprint sensor, receives fingerprint data as input from the fingerprint sensor (step S103). The registration subunit 701 then stores the received fingerprint data and the selected application in the storage unit 600 in association with each other (step S104).

The registration subunit 701 displays, on the LCD, a screen that allows selecting whether or to continue the registration processing, and receives input via the touchscreen 500 (step S105). Then, the registration subunit 701 judges whether or not to continue the registration processing in accordance with the received input.

When receiving input indicating that the registration processing is to be continued (the YES branch of step S105), the processing moves to step 101. When receiving input indicating that the registration processing is to be ended (the NO branch of step S105), the registration processing is ended.

1.2.2 Inter-Application Link Processing

Figure 5:
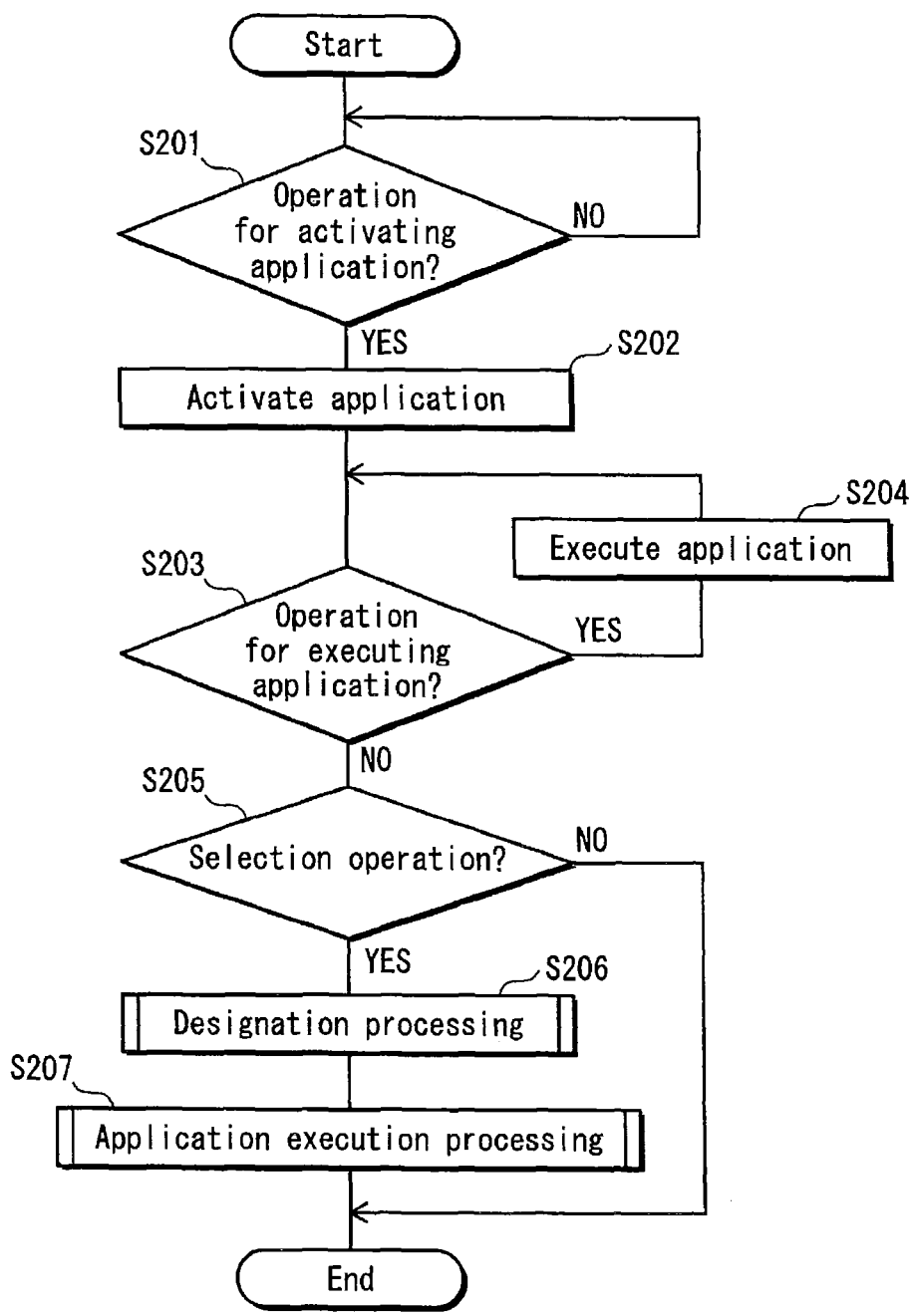
FIG. 5 is a flowchart of inter-application link processing.

The following describes the inter-application link processing performed by the mobile telephone 10. FIG. 5 is a flowchart of the inter-application link processing.

When an operation for activating an application is performed by the user via the touchscreen 500, or by the user sliding his/her finger over the fingerprint sensor 300 (the YES branch of step S201), the application execution subunit 705 activates the application (step S202) and displays a default screen for the activated application on the LCD.

The application execution subunit 705 judges whether or not the user has performed an operation for executing the activated application (step S203). When the user has performed the operation for executing the activated application (the YES branch of step S203), the application execution subunit 705 executes the activated application (step S204), and displays data acquired through execution of the activated application on the LCD. Thereafter, the processing moves to step S203.

When the user has not performed the operation for executing the activated application (the NO branch of step S203), a judgment is made as to whether or not a selection operation for selecting a predetermined character string on the screen being displayed on the LCD has been performed via the touchscreen 500 (step S205). When the selection operation has been performed (the YES branch of step S205), designation processing, which will be described later, is started (step S206). After the designation processing, application execution processing, which will be described later, is started (step S207).

1.2.2.1 Designation Processing

Figure 6:
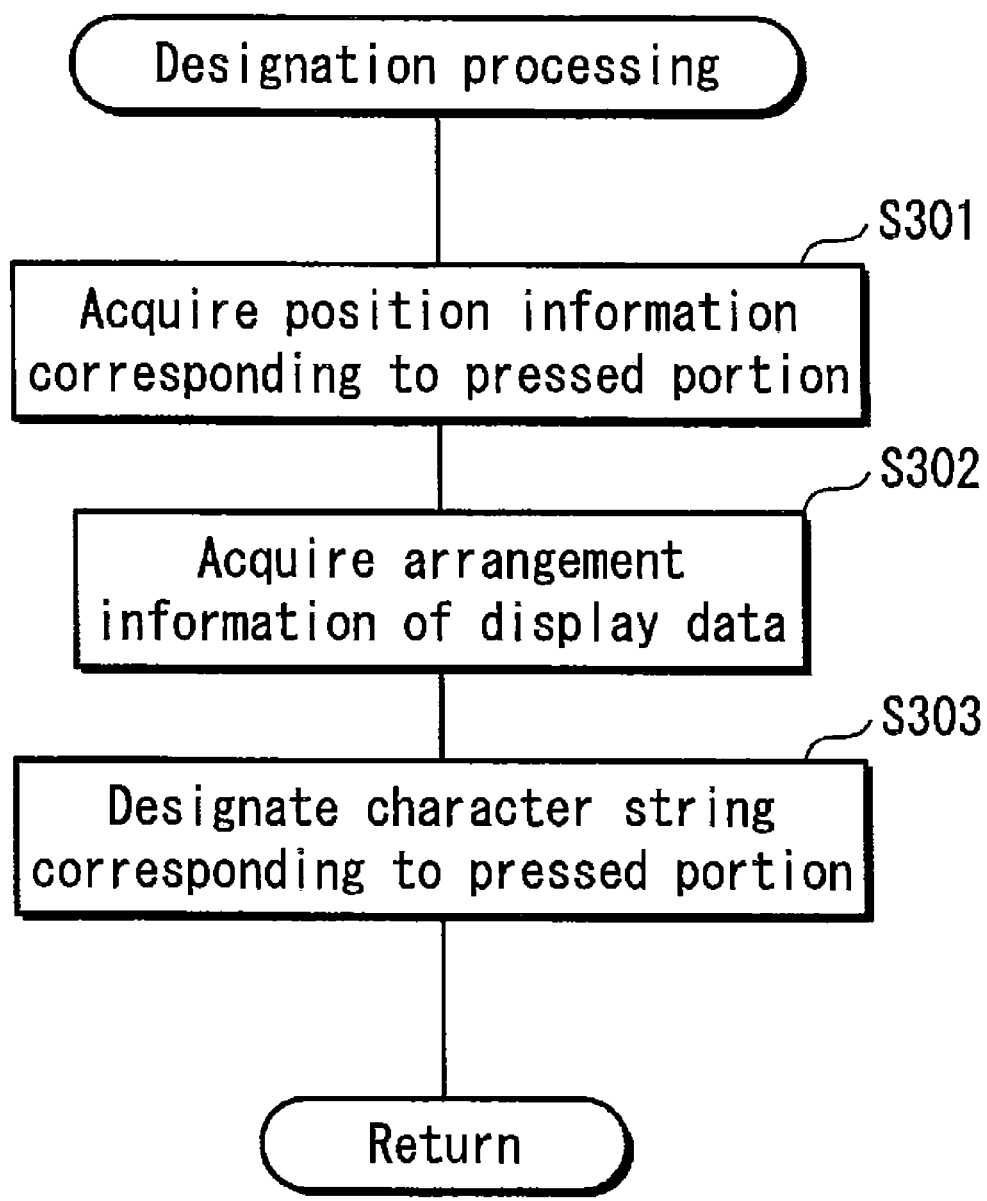
FIG. 6 is a flowchart of designation processing.

FIG. 6 is a flowchart of the designation processing performed by the mobile telephone 10.

When the user performs a selection operation for selecting a predetermined character string via the touchscreen 500, the designation subunit 702 acquires, from the touchscreen 500, position information corresponding to a position that was pressed at the time of the selection operation (step S301). The designation subunit 702 also acquires arrangement information of display data that is being displayed on the LCD (step S302). Then, in accordance with the acquired position information and arrangement information, the designation subunit 702 designates, from among the display data that is being displayed on the LCD, a character string corresponding to the position indicated by the acquired position information, and temporarily stores the designated character string (step S303).

1.2.2.2 Application Execution Processing

Figure 7:
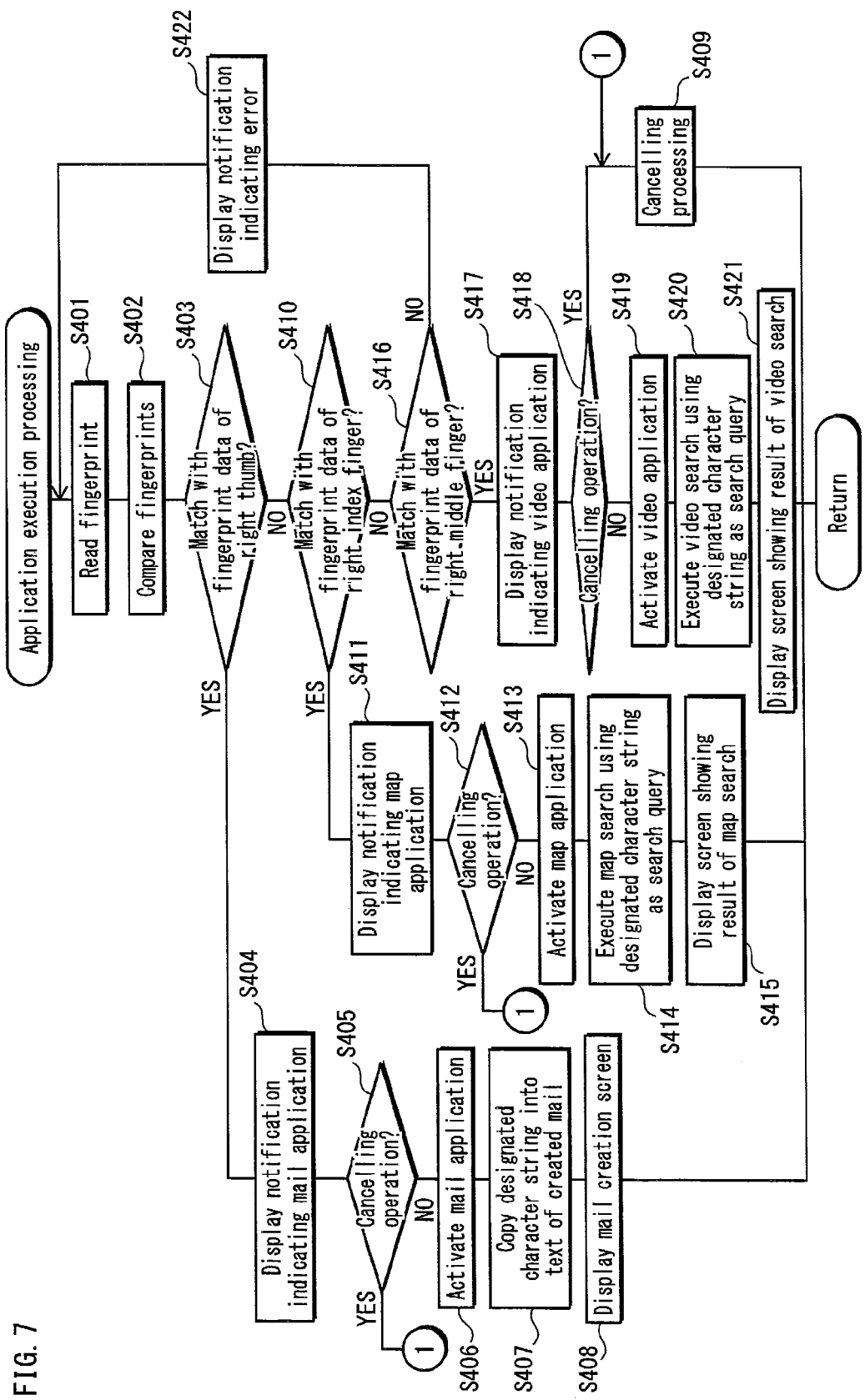
FIG. 7 is a flowchart of application execution processing.

FIG. 7 is a flowchart of the application execution processing.

After the character string is designated, the designation subunit 702 displays, on the LCD, a fingerprint input screen to encourage the user to input his/her fingerprint. Once the user has slid his/her finger over the fingerprint sensor 300, the fingerprint sensor 300 reads a fingerprint of the slid finger and generates authenticated fingerprint data (step S401).

Once the authenticated fingerprint data has been generated, the judgment subunit 703 compares the authenticated fingerprint data and each piece of fingerprint data stored in the storage unit 600 (step S402).

First, the judgment subunit 703 refers to the fingerprint-application correspondence table stored in the storage unit 600, and judges whether or not the authenticated fingerprint data matches the fingerprint data of a right thumb (step S403). When the authenticated fingerprint data matches the fingerprint data of the right thumb (the YES branch of step S403), the judgment subunit 703 judges that a mail application associated with the fingerprint data of the right thumb is to be activated. Then, the notification control subunit 704 displays, on the LCD, a notification indicating that the mail application is to be activated (step S404).

After such a notification is displayed, a judgment is made as to whether or not the user has performed a cancelling operation (step S405). By way of example, this judgment is made by judging whether or not the user has pressed a cancel button that is displayed together with the notification indicating that the mail application is to be activated. This allows the user to check the name of the application to be activated and to determine whether or not to cancel the application, thus preventing activation of an application that is different from the application the user intended to activate.

When the user has not performed the cancelling operation, i.e., when the execution operation is performed (the NO branch of step S405), the application execution subunit 705 activates the mail application (step S406), copies the designated character string into the text shown on a mail creation screen (step S407), and displays the mail creation screen on the LCD (step S408).

When the user has performed the cancelling operation (the YES branch of step S405), the application execution subunit 705 cancels activation of the mail application (step S409).

When the authenticated fingerprint data does not match the fingerprint data of the right thumb in step S403 (the NO branch of step S403), the judgment subunit 703 refers to the fingerprint-application correspondence table stored in the storage unit 600, and judges whether or not the authenticated fingerprint data matches the fingerprint data of a right index finger (step S410).

When the authenticated fingerprint data matches the fingerprint data of the right index finger (the YES branch of step S410), the judgment subunit 703 judges that a map application associated with the fingerprint data of the right index finger is to be activated. Then, the notification control subunit 704 displays, on the LCD, a notification indicating that the map application is to be activated (step S411).

After such a notification is displayed, a judgment is made as to whether or not the user has performed a cancelling operation (step S412). When the user has not performed the cancelling operation (the NO branch of step S412), the application execution subunit 705 activates the map application (step S413), executes a map search by using the designated character string as a search query (step S414), and displays a screen showing the result of the map search on the LCD (step S415).

When the user has performed the cancelling operation (the YES branch of step S412), the application execution subunit 705 cancels activation of the map application (step S409).

When the authenticated fingerprint data does not match the fingerprint data of the right index finger in step S410 (the NO branch of step S410), the judgment subunit 703 refers to the fingerprint-application correspondence table stored in the storage unit 600, and judges whether or not the authenticated fingerprint data matches the fingerprint data of a right middle finger (step S416).

When the authenticated fingerprint data matches the fingerprint data of the right middle finger (the YES branch of step S416), the judgment subunit 703 judges that a video application associated with the fingerprint data of the right middle finger is to be activated. Then, the notification control subunit 704 displays, on the LCD, a notification indicating that the video application is to be activated (step S417).

After such a notification is displayed, a judgment is made as to whether or not the user has performed a cancelling operation (step S418). When the user has not performed the cancelling operation (the NO branch of step S418), the application execution subunit 705 activates the video application (step S419), performs a video search by using the designated character string as a search query (step S420), and displays a screen showing the result of the video search on the LCD (step S421).

When the user has performed the cancelling operation (the YES branch of step S418), the application execution subunit 705 cancels activation of the video application (step S409).

When the authenticated fingerprint data does not match the fingerprint data of the right middle finger in step S416 (the NO branch of step S416), a notification indicating an error is displayed on the LCD (step S422), and the processing moves to step S401.

1.3 Specific Example of Inter-Application Link Processing Performed by Mobile Telephone 10

The following describes a specific example of the inter-application link processing performed by the mobile telephone 10. FIGS. 8A to 8D exemplarily show an operational procedure and displayed screens pertaining to a case where the user selects the character string "Osaka City" from the text shown on a received mail screen and then looks for the selected "Osaka City" using a map application.

Figure 8:
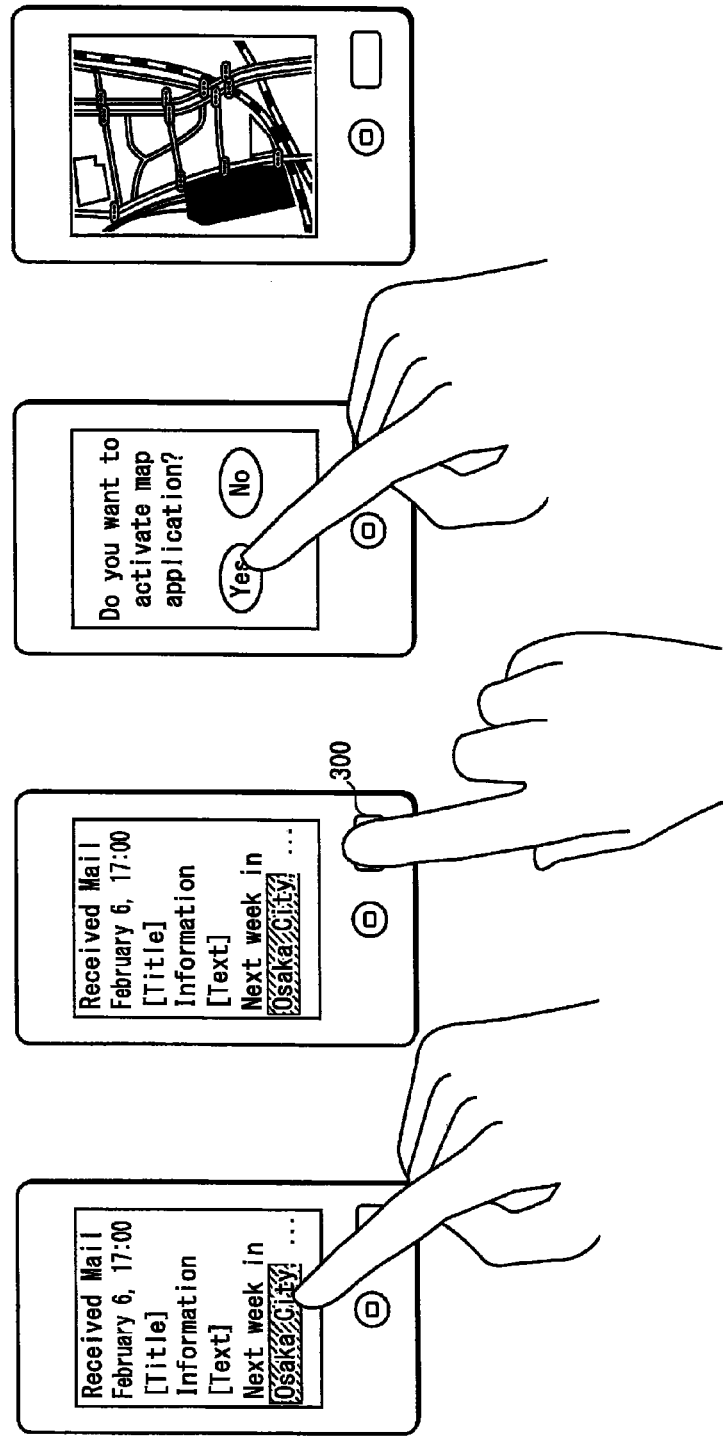
FIGS. 8A to 8D show a specific example of the inter-application link processing.

First, an operation for activating a mail application is performed by the user via the touchscreen 500, or by the user sliding his/her thumb over the fingerprint sensor 300. Subsequently, the application execution subunit 705 activates the mail application and displays a default screen on the LCD. Then, once the user has performed a predetermined operation for displaying the received mail screen, the application execution subunit 705 performs processing associated with the predetermined operation on the mail application, and displays the received mail screen on the LCD. FIG. 8A illustrates the received mail screen.

As shown in FIG. 8A, when the user performs an operation for selecting "Osaka City" from the text shown on the received mail screen, the designation subunit 703 designates "Osaka City" as a character string corresponding to a pressed position on the data being displayed on the LCD.

Next, in order to activate the map application, the user performs an operation for activating the map application by sliding his/her index finger, whose fingerprint data is associated with the map application, over the fingerprint sensor 300. FIG. 8B illustrates a user operation for activating the map application. When the user has performed the operation for activating the map application, the notification control subunit 704 displays, on the LCD, (i) a notification indicating that the map application is to be activated, and (ii) selection buttons that allow the user to select whether or not to activate the map application. Note that the "No" button illustrated in FIG. 8C is the equivalent of the above-mentioned cancel button.

When the user selects the "Yes" button, the application execution subunit 705 activates the map application, executes a map search by using "Osaka City" as a search query, and displays a screen showing the result of the map search on the LCD. FIG. 8D illustrates the screen showing the result of the map search.

As described above, according to the present embodiment, the user of the mobile telephone 10 performs an operation for selecting "Osaka City" from the text shown on the received mail screen via the touchscreen 500. Once the fingerprint sensor 300 has read the fingerprint of the index finger associated with the map application, the user can view a map of "Osaka City". The present embodiment does not require cumbersome operations (e.g., separately inputting "Osaka City" as a search criterion) after the map application is activated, thus improving the user-friendliness of the mobile telephone 10.

Modification Example

The above has described the structure and operations of the mobile telephone 10 that can improve the usability of the mobile telephone 10 upon using two applications in succession. A description is now given of the usability of a mobile telephone upon using a single application (e.g., a mail application).

In the present modification example, a storage unit 600B in a mobile telephone 10B stores therein a fingerprint-function correspondence table in place of the fingerprint-application correspondence table. As with the fingerprint-application correspondence table, the fingerprint-function correspondence table is generated as a result of execution of registration processing. It should be noted, however, that the items to be associated with pieces of fingerprint data in the fingerprint-function correspondence table upon registration are not the applications per se, but are the structural elements constituting the applications. FIG. 9 shows the fingerprint-function correspondence table for the mail application. In the present modification example, as shown in FIG. 9, fingerprint data of a left thumb and fingerprint data of a left index finger are respectively associated with a reply mail creation function and a received mail search function, which are subroutines of the mail application. The reply mail creation function is a function that allows creating and transmitting a reply mail. The received mail search function is a function that allows searching for, for example, one or more received mails whose titles contain a predetermined character string.

Figure 10:
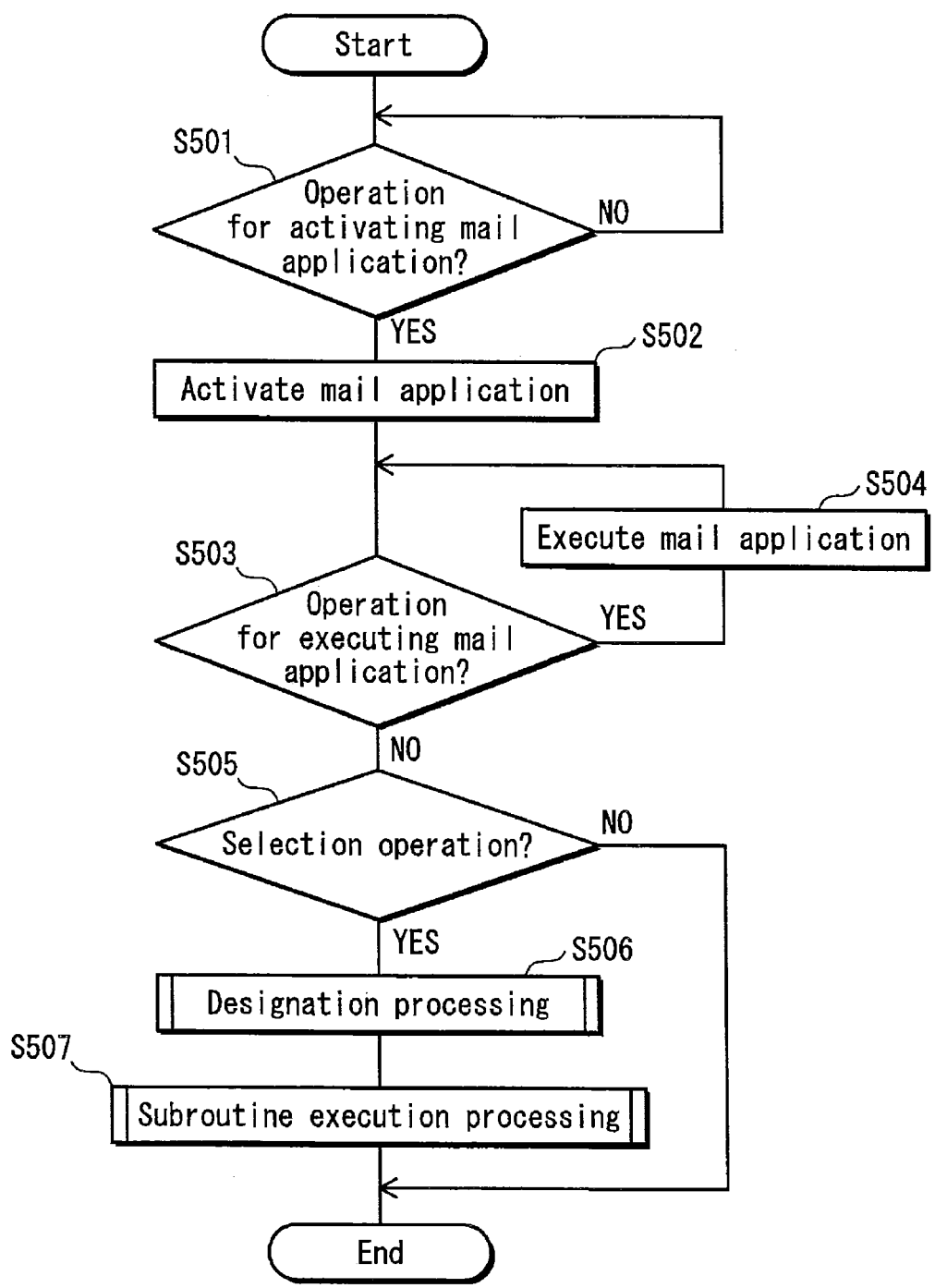
FIG. 10 is a flowchart of mail application execution processing.

FIG. 10 is a flowchart of processing performed by the mobile telephone 10B to execute the mail application.

When the operation for activating the mail application is performed by the user via the touchscreen 500, or by the user sliding his/her finger over the fingerprint sensor 300 (the YES branch of step S501), an application execution subunit 705B activates the mail application (step S502) and displays a default screen for the mail application on the LCD.

The application execution subunit 705B judges whether or not the user has performed an operation for executing the mail application (step S503). When the user has performed the operation for executing the mail application, the application execution subunit 705B executes the mail application (step S504), and displays data acquired through execution of the mail application on the LCD. Thereafter, the processing moves to step S503.

When the user has not performed the operation for executing the mail application (the NO branch of step S503), a judgment is made as to whether or not a selection operation for selecting a predetermined character string on the screen being displayed on the LCD has been performed via the touchscreen 500 (step S505). When the selection operation has been performed (the YES branch of step S505), the above-described designation processing is started (step S506). After the designation processing has been performed, subroutine execution processing, which will be described later, is started (step S507).

As the designation processing in the present modification example is the same as the one illustrated in FIG. 6, a description thereof is omitted.

Figure 11:
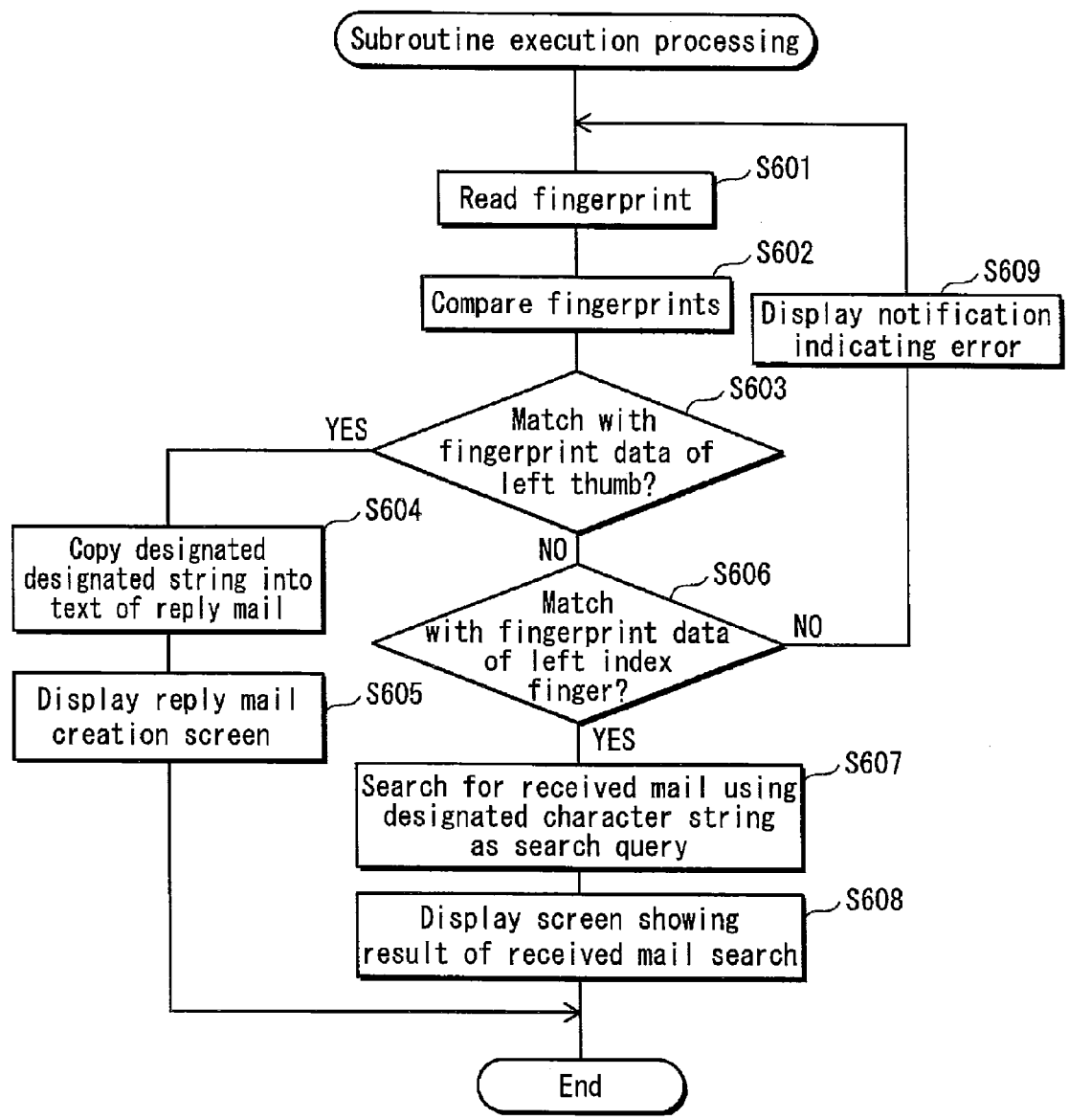
FIG. 11 is a flowchart of a subroutine execution processing.

FIG. 11 is a flowchart of the subroutine execution processing.

Steps S601 and S602 in FIG. 11 are the same as steps S401 and S402 in FIG. 7, respectively.

A judgment subunit 703B refers to the fingerprint-function correspondence table stored in the storage unit 600B, and judges whether or not the authenticated fingerprint data matches the fingerprint data of a left thumb (step S603). When the authenticated fingerprint data matches the fingerprint data of the left thumb (the YES branch of step S603), the application execution subunit 705B calls the reply mail creation function, copies the designated character string into the text shown on the reply mail creation screen (step S604), and displays the reply mail creation screen on the LCD (step S605).

When the authenticated fingerprint data does not match the fingerprint data of the left thumb in step S603 (the NO branch of step S603), the judgment subunit 703B refers to the fingerprint-function correspondence table stored in the storage unit 600B, and judges whether or not the authenticated fingerprint data matches the fingerprint data of a left index finger (step S606).

When the authenticated fingerprint data matches the fingerprint data of the left index finger (the YES branch of step S606), the application execution subunit 705B calls the received mail search function, executes a search for one or more received emails whose titles contain the designated character string by using the designated character string as a search query (step S607), and displays a screen showing the result of the search on the LCD (step S608).

When the authenticated fingerprint data does not match the fingerprint data of the left index finger in step S606 (the NO branch of step S606), a notification indicating an error is displayed on the LCD (step S609), and the processing moves to step S601.

The above structure does not require cumbersome operations (e.g., separately inputting search criteria) after the subroutine execution processing has called the subroutine associated with the fingerprint data of the user's finger on a single application. Consequently, the user-friendliness of the mobile telephone 10B can be improved.

As with the case of Embodiment 1, when the authenticated fingerprint data is judged to match the fingerprint data of the left thumb in step S603, or when the authenticated fingerprint data is judged to match the fingerprint data of the left index finger in step 606, information indicating the function associated with the matching fingerprint data may be displayed. At this time, a cancel button may be displayed together with such information, and in accordance with an input operation made by the user, control may be performed to call this function or to cancel the calling of this function.

Embodiment 2

In Embodiment 1, the fingerprint sensor 300 and the touchscreen 500 are provided as separate components. In contrast, the present embodiment is described under the assumption that a fingerprint sensor is integrated into a touchscreen—i.e., the touchscreen performs position detection and fingerprint authentication. In this case, the touchscreen must have optical resolution high enough to be able to read fingerprints. For example, with regard to image reading, the touchscreen can resolve approximately 10 lines per millimeter.

2.1 Structure of Mobile Telephone 10A

Figure 12:
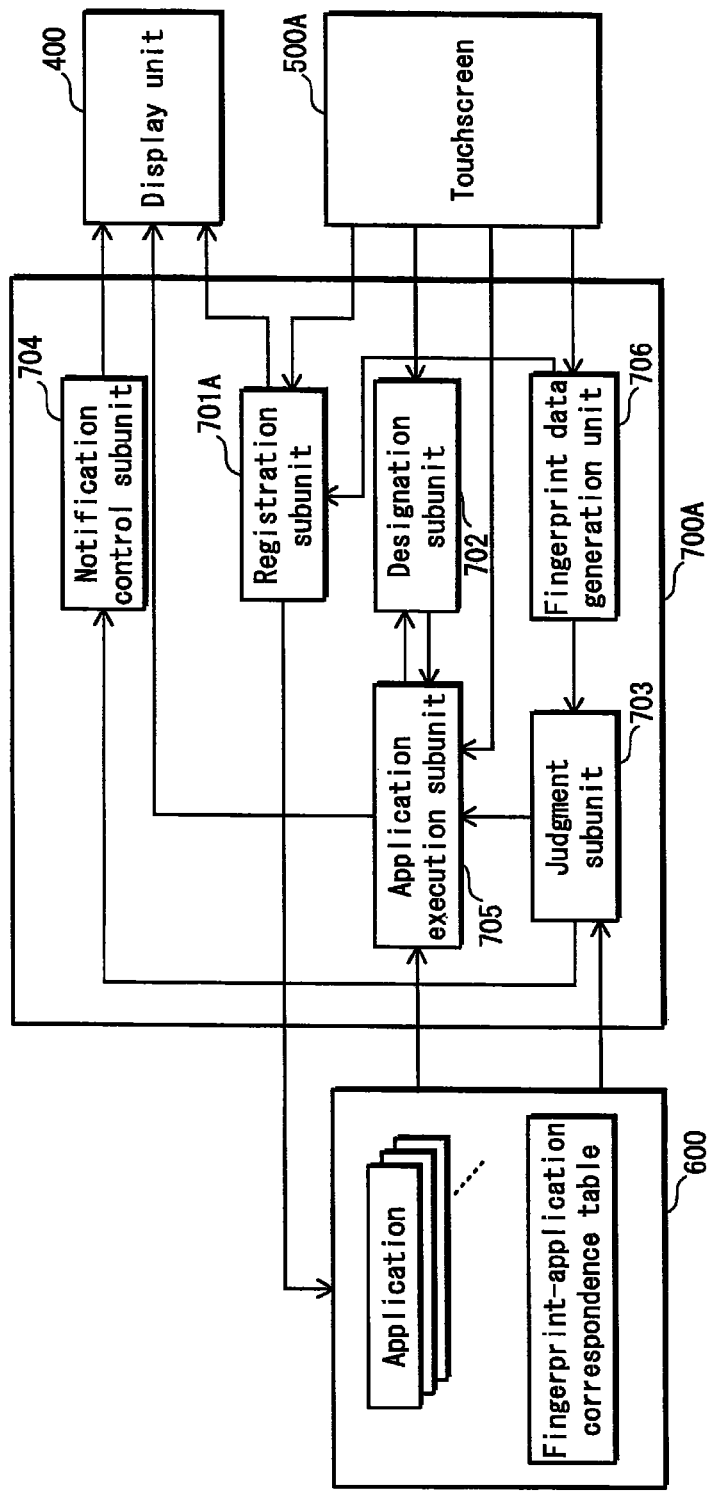
FIG. 12 is a block diagram showing the structure of a mobile telephone 10A pertaining to Embodiment 2.

FIG. 12 is a block diagram showing the structure of a mobile telephone 10A with a touchscreen capable of performing position detection and fingerprint authentication. As shown in FIG. 12, the mobile telephone 10A is composed of a display unit 400, a touchscreen 500A, a storage unit 600 and a control unit 700A.

When the user presses the touchscreen 500A with his/her finger, the touchscreen 500A detects position information corresponding to the pressed position, and transmits the detected position information to the control unit 700A. The touchscreen 500A also acquires a two-dimensional electronic image from data indicating the capacitance that is formed when the user presses the touchscreen 500A (hereinafter referred to as "two-dimensional image"). More specifically, the touchscreen 500A acquires a two-dimensional image of a fingerprint by discriminating between ridges and grooves of the fingerprint by performing threshold processing.

A fingerprint data generation subunit 706 generates fingerprint data based on the two-dimensional image of the fingerprint read by the touchscreen 500A, and transmits the generated fingerprint data to a judgment subunit 703.

A registration subunit 701A selects an application to be registered with a fingerprint-application correspondence table in accordance with an input operation made by the user via the touchscreen 500A, and stores the selected application in the storage unit 600 in association with the fingerprint data input from the fingerprint data generation subunit 706.

Other structural elements in the mobile telephone 10A are the same as their respective counterparts in the mobile telephone 10 described in Embodiment 1.

2.2 Operations of Mobile Telephone 10A

Figure 13:
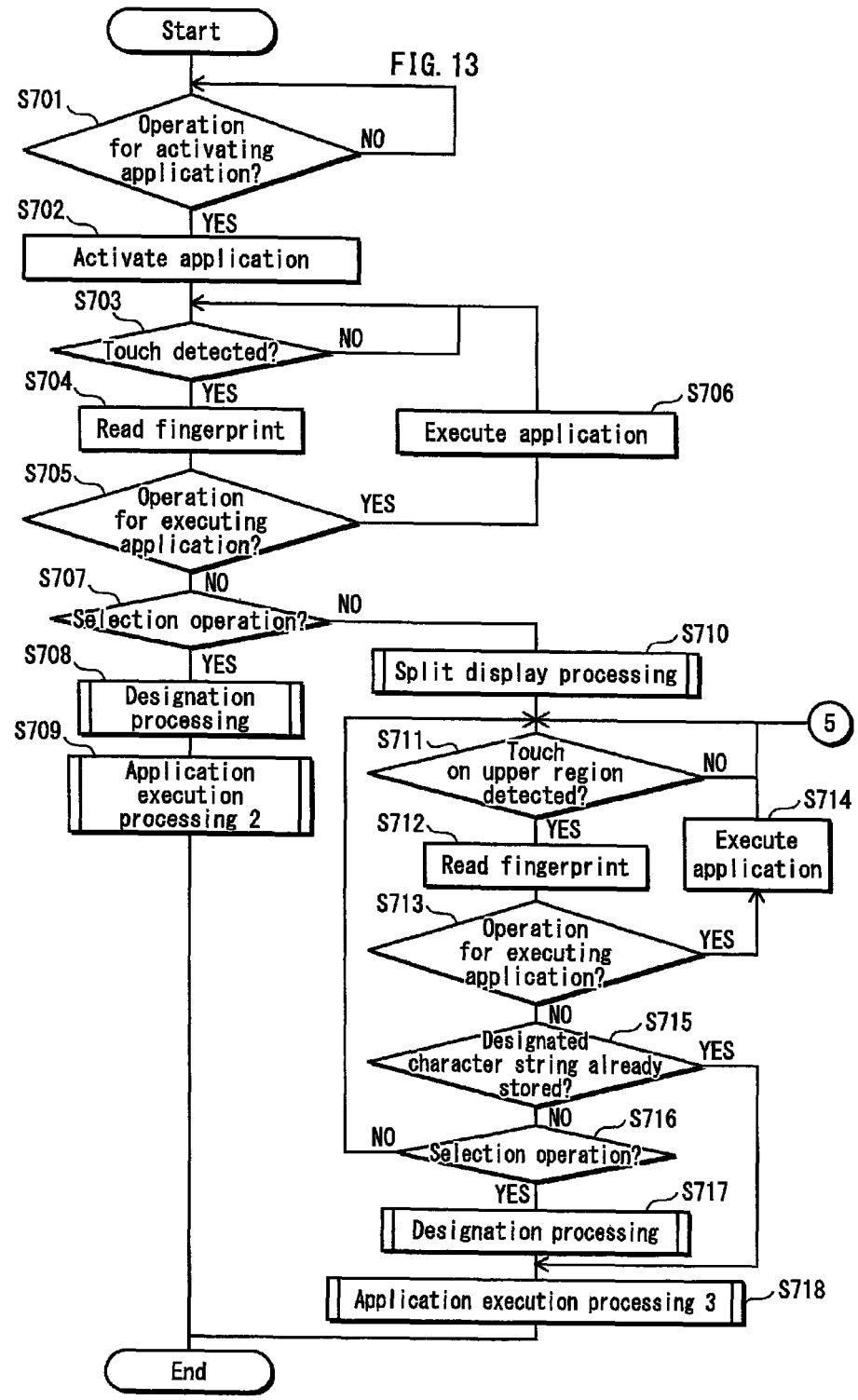
FIG. 13 is a flowchart of inter-application link processing pertaining to Embodiment 2.

A description is now given of the operations of the mobile telephone 10A.
2.2.1 Inter-Application Link Processing The following describes the inter-application link processing performed on the mobile telephone 10A. FIG. 13 is a flowchart of the inter-application link processing When an operation for activating an application is performed via the touchscreen 500A (the YES branch of step S701), an application execution subunit 705 activates the application (step S702) and displays a default screen for the activated application on the LCD.

After the default screen is displayed, the touchscreen 500A reads a fingerprint of a finger upon detecting a touch made by the finger (the YES branch of step S703), and the fingerprint data generation subunit 706 generates authenticated fingerprint data (step S704). The generated authenticated fingerprint data is temporarily stored, and is overwritten every time new authenticated fingerprint data is generated.

Furthermore, the application execution subunit 705 judges whether or not the above touch is an operation for executing the activated application (step S705). This judgment is made by, for example, judging whether or not the user has performed an operation with respect to a menu for executing the application.

Upon judging that the user has made the operation with respect to the menu, i.e., that the above touch is the operation for executing the activated application (the YES branch of step S705), the application execution subunit 705 executes the application (step S706) and displays data acquired through execution of the application on the LCD. Thereafter, the processing moves to step S703.

Upon judging that the user has not made the operation with respect to the menu, i.e., that the above touch on the touchscreen 500A is not the operation for executing the activated application (the NO branch of step S705), the application execution subunit 705 judges whether or not a selection operation for selecting a predetermined character string from the screen being displayed on the LCD has been performed via the touchscreen 500A (step S707).

When the selection operation has been performed (the YES branch of step S707), designation processing is started (step S708). After the designation processing, application execution processing 2, which will be described later, is started (step S709).

When the selection operation has not been performed (the NO branch of step S707), split display processing, which will be described later, is performed. In the split display processing, the screen displayed on the LCD is visually split into, for example, an upper region and a lower region. Data acquired through execution of an application that was activated first is displayed on the upper region of the screen, whereas data acquired through execution of an application that was activated second is displayed on the lower region of the screen.

After the split display processing, the touchscreen 500A reads a fingerprint of a finger upon detecting a touch made by the finger on the upper region (the YES branch of step S711), and the fingerprint data generation subunit 706 generates authenticated fingerprint data (step S712). As with the processing of S704, the generated authenticated fingerprint data is temporarily stored, and is overwritten every time new authenticated fingerprint data is generated.

Also, the application execution subunit 705 judges whether or not the above touch is an operation for executing the application that was activated first (step S713). This judgment is made by, for example, judging whether or not the user has performed an operation with respect to a menu for executing the application that was activated first.

Upon judging that the user has performed the operation with respect to the menu, i.e., that the above touch is the operation for executing the application that was activated first (the YES branch of step S713), the application execution subunit 705 executes the application that was activated first (step S714), and displays data acquired through execution of this application on the upper region of the LCD. Thereafter, the processing moves to step S711.

Upon judges that the user has not performed the operation with respect to the menu, i.e., that the above touch on the touchscreen 500A is not the operation for executing the application that activated first (the NO branch of step S713), the application execution subunit 705 judges whether or not the designated character string has already been stored (step S715).

When the designated character string is not stored yet (the NO branch of step S715), a judgment is made as to whether or not a selection operation for selecting a predetermined character string displayed on the upper region of the screen has been performed via the touchscreen 500A (step S716).

When the selection operation has been performed (the YES branch of step S716), designation processing is started (step S717). After the designation processing, application execution processing 3, which will be described later, is started (step S718).

When the selection operation has not been performed (the NO branch of step S716), the processing moves to step S711.

When the designated character string has already been stored in step S715 (the YES branch of step S715), the processing moves to step 718.

2.2.1.1 Application Execution Processing 2

Figure 14:
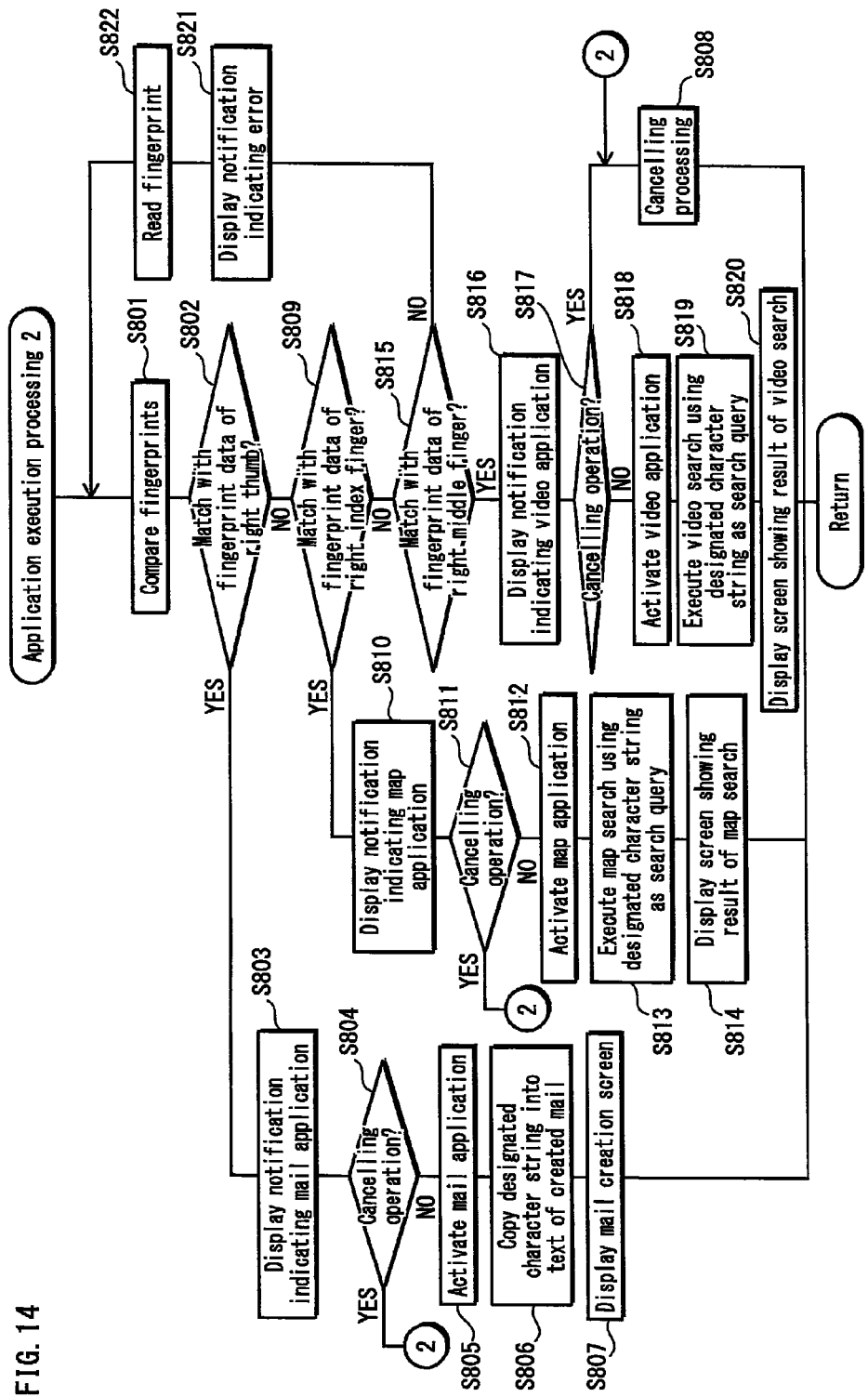
FIG. 14 is a flowchart of application execution processing 2.

FIG. 14 is a flowchart of the application execution processing 2.

After the character string is designated in the designation processing in step 708, the judgment subunit 703 compares the authenticated fingerprint data, which has been generated in step S704 and stored, with each piece of fingerprint data stored in the storage unit 600 (step S801).

First, the judgment subunit 703 refers to the fingerprint-application correspondence table stored in the storage unit 600, and judges whether or not the authenticated fingerprint data matches the fingerprint data of a right thumb (step S802). When the authenticated fingerprint data matches the fingerprint data of the right thumb (the YES branch of step S802), the judgment subunit 703 judges that the mail application associated with the fingerprint data of the right thumb is to be activated. Then, the notification control subunit 704 displays, on the LCD, a notification indicating that the mail application is to be activated (step S803).

After such a notification is displayed, a judgment is made as to whether or not the user has performed a cancelling operation (step S804).

When the user has not performed the cancelling operation, i.e., when an execution operation has been performed (the NO branch of step S804), the application execution subunit 705 activates the mail application (step S805), copies the designated character string into the text shown on a mail creation screen (step S806), and displays the mail creation screen on the LCD (step S807).

When the user has performed the cancelling operation (the YES branch of step S804), the application execution subunit 705 cancels activation of the mail application (step S808).

When the authenticated fingerprint data does not match the fingerprint data of the right thumb in step S802 (the NO branch of step S802), the judgment subunit 703 refers to the fingerprint-application correspondence table stored in the storage unit 600, and judges whether or not the authenticated fingerprint data matches the fingerprint data of a right index finger (step S809).

When the authenticated fingerprint data matches the fingerprint data of the right index finger (the YES branch of step S809), the judgment subunit 703 judges that a map application associated with the fingerprint data of the right index finger is to be activated. Then, the notification control subunit 704 displays, on the LCD, a notification indicating that the map application is to be activated (step S810).

After such a notification is displayed, a judgment is made as to whether or not the user has performed a cancelling operation (step S811). When the user has not performed the cancelling operation (the NO branch of step S811), the application execution subunit 705 activates the map application (step S812), performs a map search by using the designated character string as a search query (step S813), and displays a screen showing the result of the map search on the LCD (step S814).

When the user has performed the cancelling operation (the YES branch of step S811), the application execution subunit 705 cancels activation of the map application (step S808).

When the authenticated fingerprint data does not match the fingerprint data of the right index finger in step S809 (the NO branch of step S809), the judgment subunit 703 refers to the fingerprint-application correspondence table stored in the storage unit 600, and judges whether or not the authenticated fingerprint data matches the fingerprint data of a right middle finger (step S815).

When the authenticated fingerprint data matches the fingerprint data of the right middle finger (the YES branch of step S815), the judgment subunit 703 judges that a video application associated with the fingerprint data of the right middle finger is to be activated. Then, the notification control subunit 704 displays, on the LCD, a notification indicating that the video application is to be activated (step S816).

After such a notification is displayed, a judgment is made as to whether or not the user has performed a cancelling operation (step S817). When the user has not performed the cancelling operation (the NO branch of step S817), the application execution subunit 705 activates the video application (step S818), performs a video search by using the designated character string as a search query (step S819), and displays a screen showing the result of the video search on the LCD (step S820).

When the user has performed the cancelling operation (the YES branch of step S817), the application execution subunit 705 cancels activation of the video application (step S808).

When the authenticated fingerprint data does not match the fingerprint data of the right middle finger in step 815 (the NO branch of step S815), a notification indicating an error is displayed on the LCD (step S821), the user's input of his/her fingerprint is received again (step S822), and the processing moves to step S801.

2.2.1.2 Split Display Processing

Figure 15:
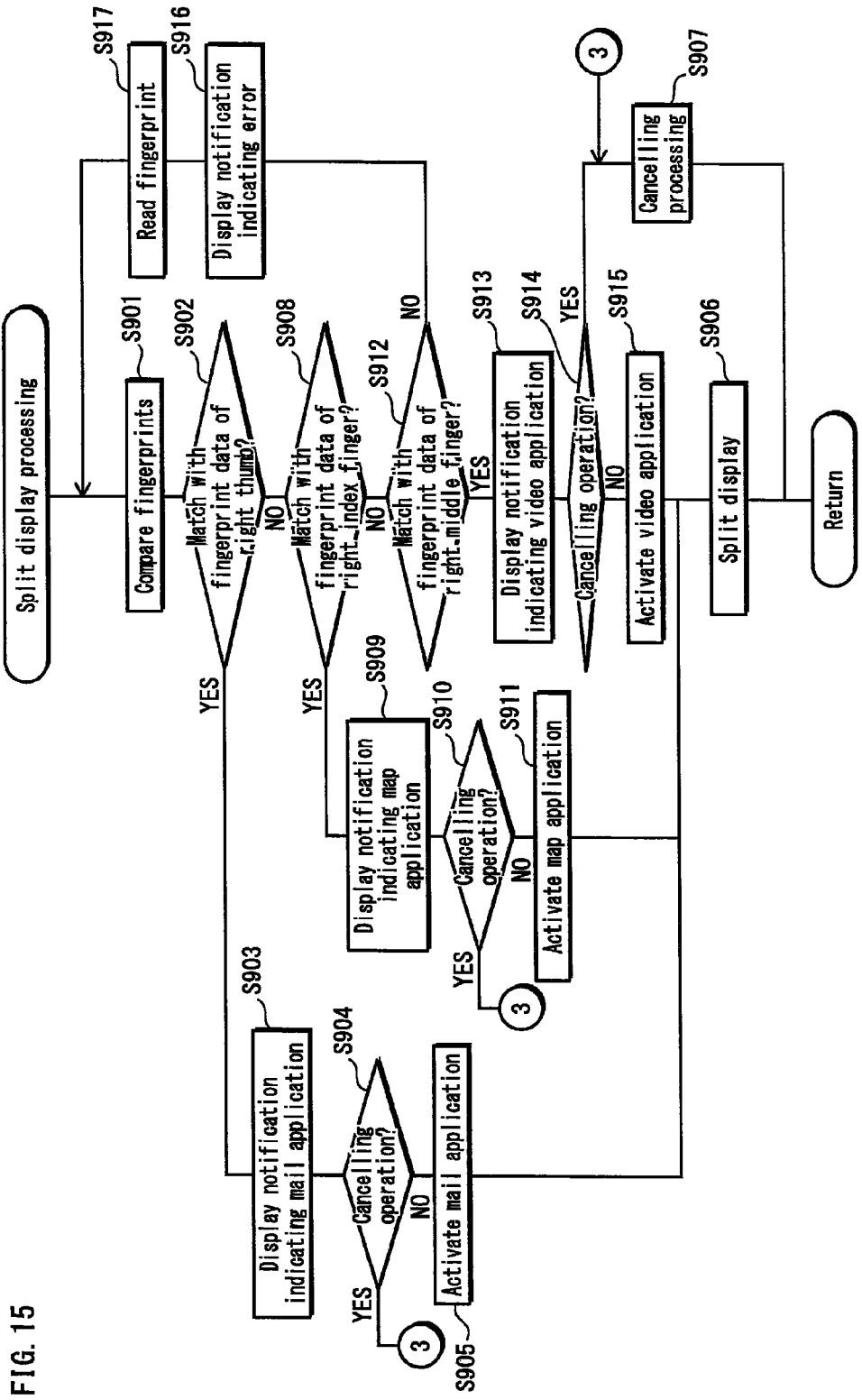
FIG. 15 is a flowchart of split display processing.

FIG. 15 is a flowchart of the split display processing.

When the selection operation has not been performed in step S707, the judgment subunit 703 compares the authenticated fingerprint data, which has been generated in step S704 and stored, with each piece of fingerprint data stored in the storage unit 600 (step S901).

First, the judgment subunit 703 refers to the fingerprint-application correspondence table stored in the storage unit 600, and judges whether or not the authenticated fingerprint data matches the fingerprint data of a right thumb (step S902). When the authenticated fingerprint data matches the fingerprint data of the right thumb (the YES branch of step S902), the judgment subunit 703 judges that a mail application associated with the fingerprint data of the right thumb is to be activated, and the notification control subunit 704 displays, on the LCD, a notification indicating that the mail application is to be activated (step S903).

After such a notification is displayed, a judgment is made as to whether or not the user has performed a cancelling operation (step S904).

When the user has not performed the cancelling operation, i.e., when the user has performed an execution operation (the NO branch of step S904), the application execution subunit 705 activates the mail application (step S905) and displays a plurality of applications in the form of split screen display (step S906) by (i) displaying data acquired through execution of the application activated in step 702 on the upper region, and (ii) displaying a default screen for the activated mail application on the lower region, the upper and lower regions being obtained by visual vertical splitting of the screen of the LCD.

When the user has performed the cancelling operation (the YES branch of step S904), the application execution subunit 705 cancels activation of the mail application (step S907).

When the authenticated fingerprint data does not match the fingerprint data of the right thumb in step S902 (the NO branch of step S902), the judgment subunit 703 refers to the fingerprint-application correspondence table stored in the storage unit 600, and judges whether or not the authenticated fingerprint data matches the fingerprint data of a right index finger (step S908).

When the authenticated fingerprint data matches the fingerprint data of the right index finger (the YES branch of step S908), the judgment subunit 703 judges that a map application associated with the fingerprint data of the right index finger is to be activated. Then, the notification control subunit 704 displays, on the LCD, a notification indicating that the map application is to be activated (step S909).

After such a notification is displayed, a judgment is made as to whether or not the user has performed a cancelling operation (step S910). When the user has not performed the cancelling operation (the NO branch of step S910), the application execution subunit 705 activates the map application (step S911), and displays a plurality of applications in the form of split screen display (step S906) by (i) displaying data acquired through execution of the application activated in step 702 on the upper region, and (ii) displaying a default screen for the activated map application on the lower region, the upper and lower regions being obtained by visual vertical splitting of the screen of the LCD.

When the user has performed the cancelling operation (the YES branch of step S910), the application execution subunit 705 cancels activation of the map application (step S907).

When the authenticated fingerprint data does not match the fingerprint data of the right index finger in step S908 (the NO branch of step S908), the judgment subunit 703 refers to the fingerprint-application correspondence table stored in the storage unit 600, and judges whether or not the authenticated fingerprint data matches the fingerprint data of a right middle finger (step S912).

When the authenticated fingerprint data matches the fingerprint data of the right middle finger (the YES branch of step S912), the judgment subunit 703 judges that a video application associated with the fingerprint data of the right middle finger is to be activated. Then, the notification control subunit 704 displays, on the LCD, a notification indicating that the video application is to be activated (step S913).

After such a notification is displayed, the judgment subunit 703 judges whether or not the user has performed a cancelling operation (step S914). When the user has not performed the cancelling operation (the NO branch of step S914), the application execution subunit 705 activates the video application (step S915), and displays a plurality of applications in the form of split screen display (step S906) by (i) displaying data acquired through execution of the application activated in step 702 on the upper region, and (ii) displaying a default screen for the activated video application on the lower region, the upper and lower regions being obtained by visual vertical splitting of the LCD.

When the user has performed the cancelling operation (the YES branch of step S914), the application execution subunit 705 cancels activation of the video application (step S907).

When the authenticated fingerprint data does not match the fingerprint data of the right middle finger in step S912 (the NO branch of step S912), a notification indicating an error is displayed on the LCD (step S916), the user's input of his/her fingerprint is received again (step S917), and the processing moves to step S901.

2.2.1.3 Application Execution Processing 3

Figure 16:
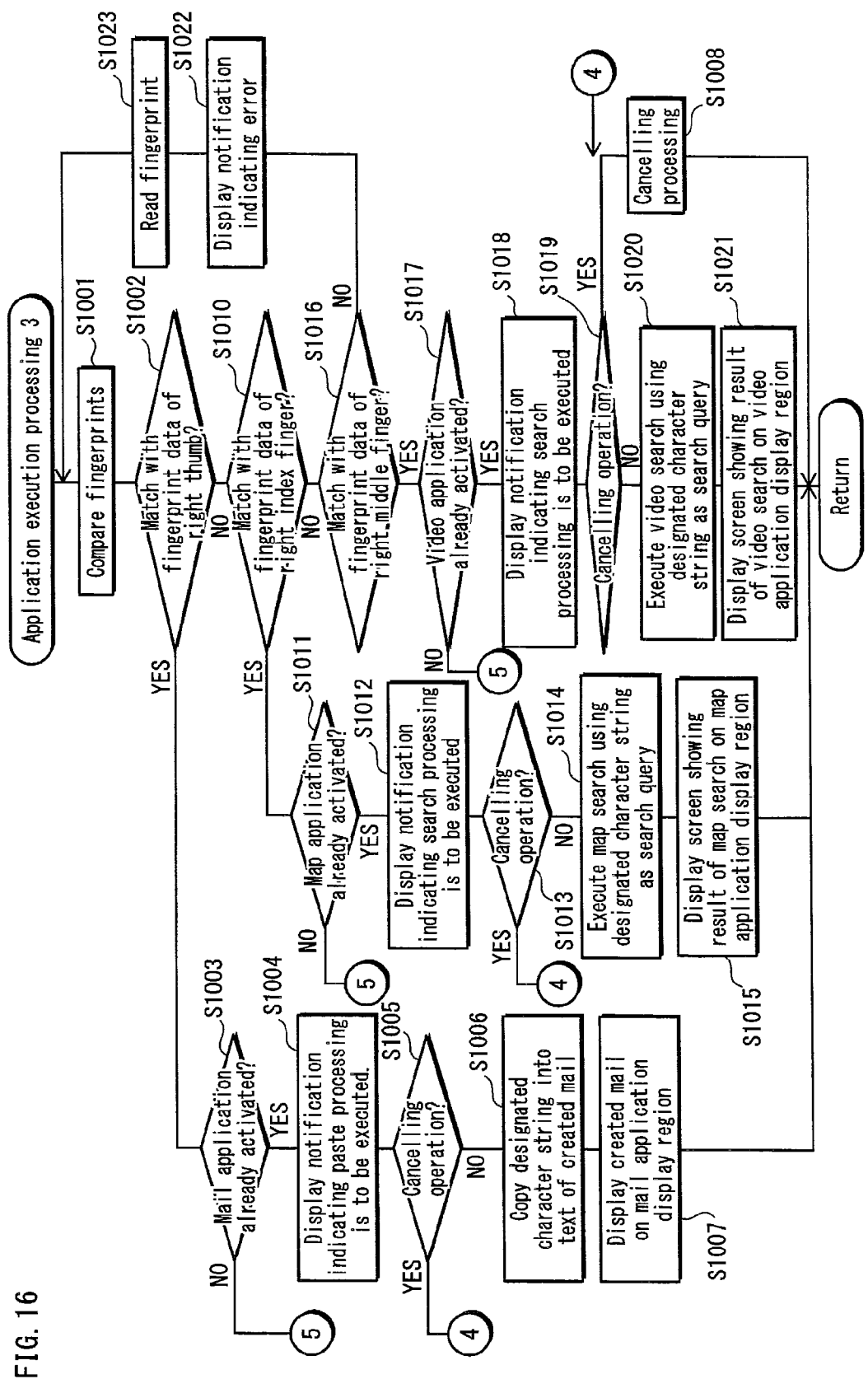
FIG. 16 is a flowchart of application execution processing 3.

FIG. 16 is a flowchart of the application execution processing 3.

After the character string is designated in the designation processing of step S716, the judgment subunit 703 compares the authenticated fingerprint data, which has been generated in step S712 and stored, with each piece of fingerprint data stored in the storage unit 600 (step S1001).

First, the judgment subunit 703 refers to the fingerprint-application correspondence table stored in the storage unit 600, and judges whether or not the authenticated fingerprint data matches the fingerprint data of a right thumb (step S1002). When the authenticated fingerprint data matches the fingerprint data of the right thumb (the YES branch of step S1002), the judgment subunit 703 judges that a mail application associated with the fingerprint data of the right thumb is to be activated.

The application execution subunit 705 judges whether or not the mail application has already been activated (step S1003). When the mail application has already been activated (the YES branch of step S1003), the application execution subunit 705 does not newly activate the mail application, but copies the designated character string into the text shown on the mail creation screen of the activated mail application and executes processing for displaying the mail creation screen (copy/display processing).

More specifically, when the authenticated fingerprint data matches the fingerprint data of the right thumb and the mail application has already been activated, the notification control subunit 704 displays, on the LCD, a notification indicating that the copy/display processing is to be executed (step S1004), and judges whether or not the user has performed a cancelling operation (step S1005).

When the user has not performed the cancelling operation, i.e., when the user has performed an execution operation (the NO branch of step S1005), the application execution subunit 705 copies the designated character string into the text shown on the mail creation screen (step S1006) and displays the mail creation screen on the lower region where the mail application is being displayed, the lower region being a lower one of two regions of the LCD that are obtained by visual vertical splitting of the LCD (step S1007).

When the user has performed the cancelling operation (the YES branch of step S1005), the application execution subunit 705 cancels the copy/display processing (step S1008).

When the authenticated fingerprint data does not match the fingerprint data of the right thumb in step S1002 (the NO branch of step S1002), the judgment subunit 703 refers to the fingerprint-application correspondence table stored in the storage unit 600, and judges whether or not the authenticated fingerprint data matches the fingerprint data of a right index finger (step S1010).

When the authenticated fingerprint data matches the fingerprint data of the right index finger (the YES branch of step S1008), the judgment subunit 703 judges that a map application associated with the fingerprint data of the right index finger is to be activated.

The application execution subunit 705 judges whether or not the map application has already been activated (step S1011). When the map application has already been activated (the YES branch of step S1011), the application execution subunit 705 does not newly activate the map application, but executes a map search on the activated map application by using the designated character string as a search query, and displays a screen showing the result of the map search.

More specifically, when the authenticated fingerprint data matches the fingerprint data of the right index finger and the map application has already been activated, the notification control subunit 704 displays, on the LCD, a notification indicating that the search processing of the map application is to be executed (step S1012), and judges whether or not the user has performed a cancelling operation (step S1013).

When the user has not performed the cancelling operation (the NO branch of step S1013), the application execution subunit 705 executes a map search by using the designated character string as a search query (step S1014), and displays a screen showing the result of the map search on the lower region where the map application is displayed, the lower region being a lower one of two regions of the LCD that are obtained by visual vertical splitting of the LCD (step S1015).

When the user has performed the cancelling operation (the YES branch of step S1013), the application execution subunit 705 cancels the search processing of the map application (step S1008).

When the authenticated fingerprint data does not match the fingerprint data of the right index finger in step S1010 (the NO branch of step S1010), the judgment subunit 703 refers to the fingerprint-application correspondence table stored in the storage unit 600, and judges whether or not the authenticated fingerprint data matches the fingerprint data of a right middle finger (step S1016).

When the authenticated fingerprint data matches the fingerprint data of the right middle finger (the YES branch of step S1016), the judgment subunit 703 judges that a video application associated with the fingerprint data of the right middle finger is to be activated. The application execution subunit 705 judges whether or not the video application has already been activated (step S1017). When the video application has already been activated (the YES branch of step S1017), the application execution subunit 705 does not newly activate the video application, but executes a video search on the activated video application by using the designated character string as a search query, and displays a screen showing the result of the video search.

More specifically, when the authenticated fingerprint data matches the fingerprint data of the right middle finger and the video application has already been activated, the notification control subunit 704 displays, on the LCD, a notification indicating that the search processing of the video application is to be executed (step S1018), and judges whether or not the user has performed a cancelling operation (step S1019).

When the user has not performed the cancelling operation (the NO branch of step S1019), the application execution subunit 705 performs a video search by using the designated character string as a search query (step S1020), and displays a screen showing the result of the video search on the lower region where the video application is being displayed, the lower region being lower one of two regions of the LCD that are obtained by visual vertical splitting of the LCD (step S1021).

When the user has performed the cancelling operation (the YES branch of step S1019), the application execution subunit 705 cancels the search processing of the video application (step S1008).

When the authenticated fingerprint data does not match the fingerprint data of the right middle finger in step S1016 (the NO branch of step S1016), a notification indicating an error is displayed on the LCD (step S1022), the user's input of his/her fingerprint is received again (step S1023), and the processing moves to step S1001.

2.3 Specific Example of Inter-Application Link Processing Performed by Mobile Telephone 10A The following describes a specific example of the inter-application link processing performed by the mobile telephone 10A. FIGS. 17A to 19G exemplarily show an operational procedure and displayed screens pertaining to a case where, after split screen display is performed upon activation of the map application during display of a received mail screen, the user selects the character string "Osaka City" from the text shown on the received mail screen and then looks for the selected "Osaka City" using the map application.

Figure 17A:
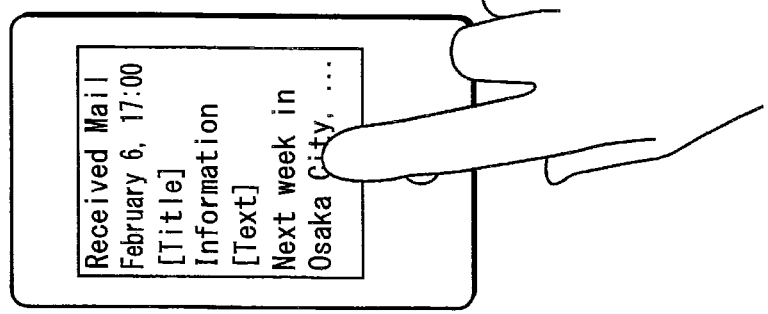
FIGS. 17A to 17C show a part of a specific example of the inter-application link processing pertaining to Embodiment 2.

First, after the user has performed an operation for activating a mail application via the touchscreen 500, the application execution subunit 705 activates the mail application and displays a default screen on the LCD. Then, once the user has performed a predetermined operation for displaying the received mail screen, the application execution subunit 705 performs processing associated with the predetermined operation on the mail application, and displays the received mail screen on the LCD. FIG. 17A shows the right index finger of the user touching the touchscreen 500A of the mobile telephone 10A that is displaying the received mail screen.

As shown in FIG. 17A, the user performs an operation for activating the map application by touching the touchscreen 500A with his/her right index finger during display of the received mail screen. It should be noted that an operation for sliding the right index finger while it is touching the touchscreen 500A is not performed in the present example. That is to say, the user does not perform the selection operation, but only performs the operation for activating the map application.

Figure 17B:
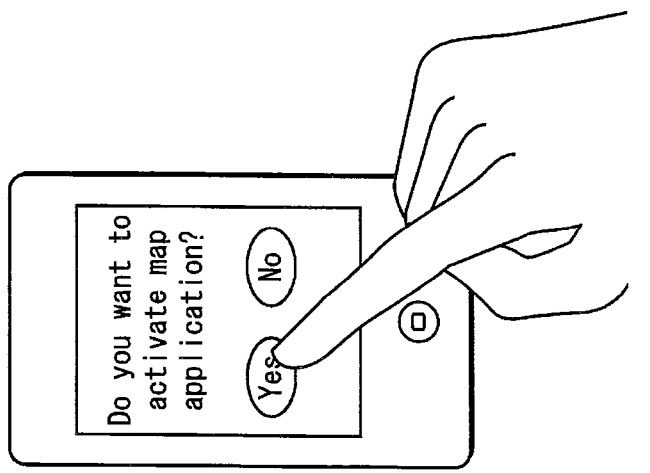

When the user has performed the operation for activating the map application, the notification control subunit 704 displays, on the LCD, a notification indicating that the map application is to be activated, as well as selection buttons that allow the user to select whether or not to activate the map application, as shown in FIG. 17B.

Figure 17C:
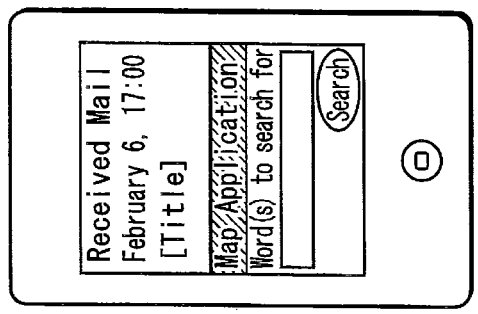

When the user selects the "Yes" button, the application execution subunit 705 activates the map application, and displays the received mail screen on the upper region and a default screen for the map application on the lower region, the upper and lower regions being obtained by visual vertical splitting of the LCD. FIG. 17C illustrates the split screen display where the received mail screen is displayed on the upper region and the default screen for the map application is displayed on the lower region.

Figure 18E:
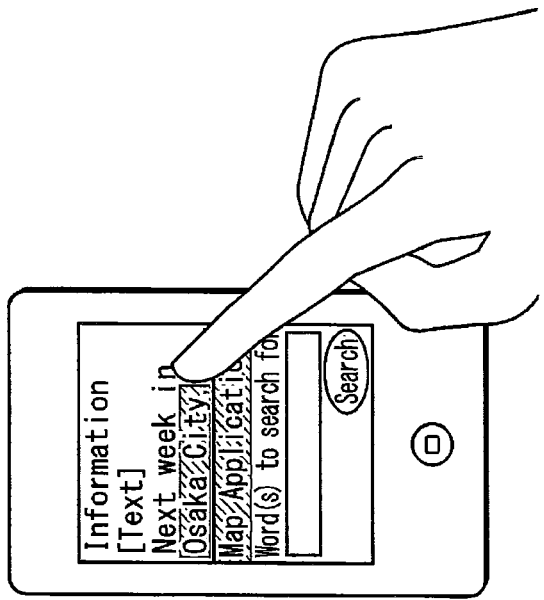
FIGS. 18D and 18E show another part of the specific example of the inter-application link processing pertaining to Embodiment 2, said another part being a continuation of the part shown in FIGS. 17A to 17C.
Figure 18D:
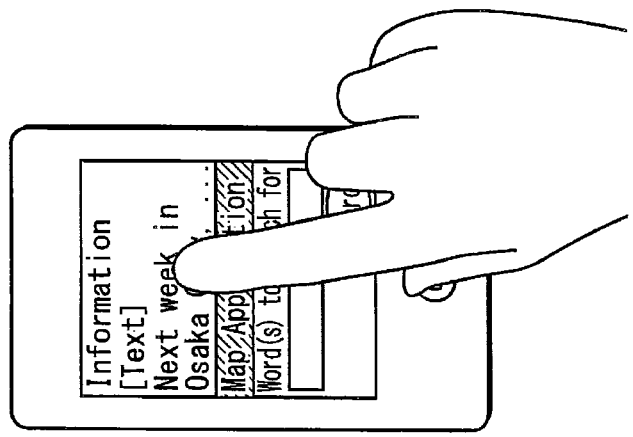

During the split screen display, as illustrated in FIGS. 18D and 18E, the user performs an operation for selecting, with his right index finger, "Osaka City" from the text shown on the received mail screen that is being displayed on the upper region, i.e., the upper one of two regions of the LCD that are obtained by visual vertical splitting of the LCD. Subsequently, the fingerprint data generation subunit 706 generates fingerprint data, and the designation subunit 703 designates "Osaka City" as a character string corresponding to the pressed position on the data being displayed on the LCD.

Figure 19F:
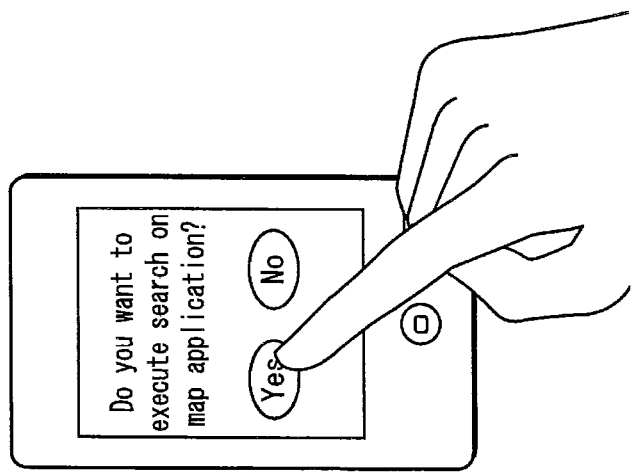
FIGS. 19F and 19G show yet another part of the specific example of the inter-application link processing pertaining to Embodiment 2, said yet another part being a continuation of the part shown in FIGS. 18D and 18E.

As shown in FIG. 19F, the notification control subunit 704 displays, on the LCD, a notification indicating that the search processing of the map application is to be executed, as well as selection buttons that allow the user to select whether or not to execute the search processing.

Figure 19G:
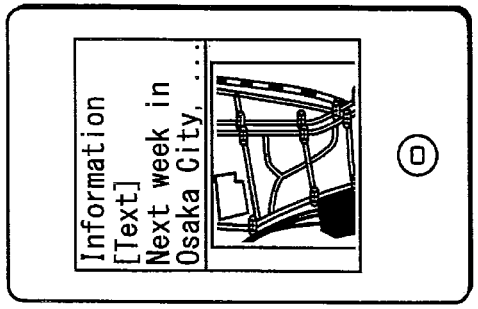

When the user selects the "Yes" button, the application execution subunit 705 executes the map search by using "Osaka City" as a search query, and displays, on the lower region of the LCD, a screen showing execution of the map search of the map application. FIG. 19G illustrates the screen showing execution of the map search of the map application, as displayed on the lower region of the LCD.

As described above, as with Embodiment 1, the present embodiment does not require the user of the mobile telephone 10A, which is capable of performing position detection and fingerprint authentication via the touchscreen, to perform cumbersome operations (e.g., separately inputting search criteria and the like) after an application is activated through the application execution processing. The present embodiment can therefore improve the user-friendliness of the mobile telephone 10A.

Furthermore, as the touchscreen 500A can perform the position detection and fingerprint authentication, the user has to perform operations only with respect to the touchscreen 500A. That is to say, in the present embodiment, the user need not slide his/her finger over the fingerprint sensor 300 after performing an operation via the touchscreen 500 as described in Embodiment 1. Consequently, the usability of the mobile telephone 10A is further improved.

In addition, as the data obtained by executing each application is displayed in the form of split screen display, the user can perform operations while checking both regions of the LCD. This can further improve the user-friendliness of the mobile telephone 10A.

Moreover, in a case where two applications are respectively displayed on the two regions of the LCD that are obtained by visual splitting of the LCD, if an operation on an application displayed on the upper region (an application that was activated first) is performed with use of a finger different from a finger associated with fingerprint data corresponding to an application displayed on the lower region (an application that was activated second), this operation is judged as being performed to execute the application displayed on the upper region; consequently, the application displayed on the upper region is executed. This can prevent erroneous operations. Furthermore, during operation, the user need not select one of the two applications that are currently being executed. This can improve the user-friendliness of the mobile telephone 10A.

(Supplementary Notes)

A data processing device pertaining to the present invention has been described above based on the embodiments. However, it goes without saying that the present invention is not limited to the above embodiments.

(1) In the above embodiments, the data processing device pertaining to the present invention has been introduced as a mobile telephone by way of example. However, the data processing device pertaining to the present invention is not limited to a mobile telephone. For example, the data processing device pertaining to the present invention may be a device such as a PDA, personal communicator, and car navigation, and may take any form as long as it has biometric authentication functions that allow calling a function equipped with the data processing device based on biometric information and executing the called function.

(2) It has been described in the above embodiments that the mobile telephone comprises a touchscreen. Alternatively, the mobile telephone may comprise a key operation unit including a cross key for making directional instructions and numeric keys. In this case, in accordance with a user operation made via the key operation unit, a character string is designated as data input to an application to be activated.

(3) The above embodiments have described an electrostatic capacitive touchscreen. Alternatively, a touchscreen employing other methods may be used, such as a resistive touchscreen and a touchscreen equipped with an optical sensor.

Alternatively, the touchscreen may not be provided. In this case, an optical sensor may be built in each pixel of a liquid crystal panel such that the LCD itself functions as an image sensor. Here, the position detection and fingerprint authentication may be performed by the LCD.

(4) It has been described in the above embodiments that the notification control subunit 704 notifies the user of information indicating an application via image display. Alternatively, such notification may be performed via audio output.

(5) It has been described in the above embodiments that the mobile telephone 10 activates one application associated with the fingerprint data authenticated by the fingerprint sensor 300 after a character string is designated in accordance with a user operation. Alternatively, the user may have a plurality of fingers authenticated by the fingerprint sensor to activate a plurality of applications associated with pieces of fingerprint data of the authenticated fingers. For example, after a predetermined character string included in the text of a received mail is designated as a designated character string, the above structure enables execution of a map application and a video application by using the designated character string as a search query. In other words, the above structure allows executing processing by using the designated character string on each of a plurality of applications.

(6) It has been described in the above embodiments that a character string is selected by the user running his/her finger over the touchscreen. However, a character string may be selected using other methods. For example, the user may select a character string by any one of (i) pressing the character string several times, (ii) pressing the character string after running his/her finger over the character string, and (iii) pressing the character string with a high pressure.

(7) In the above embodiments, the judgment subunit 703 makes a comparison among pieces of fingerprint data in accordance with characteristics of fingerprints (characteristics extraction method). Alternatively, a matching method may be incorporated in making a comparison among fingerprints.

(8) In the above embodiments, the mail application, the map application and the video application are associated one-to-one with different pieces of fingerprint data. Alternatively, other applications provided in the data processing device (e.g., a browser, music application, 1 seg service and game application) may be associated one-to-one with different pieces of fingerprint data.

(9) It has been described in the above embodiments that a character string is designated as data input to an application to be activated in accordance with a user operation made via the touchscreen. However, the target of such designation is not limited to a character string. Any item could be the target of such designation as long as it can realize effects that are similar to those achieved when a character string is designated. For example, a still image may be designated. For example, a music application may be activated as follows after the still image is designated: the application execution subunit (i) activates the music application in accordance with the associated fingerprint data, (ii) searches for a title, singer, composer or lyricist that includes the character string associated with the designated still image, and (iii) displays a result of the search on the LCD.

(10) It has been described in the above embodiments that an application is activated in accordance with fingerprint data of a corresponding finger of the user. Alternatively, an application may be activated in accordance with a vein pattern of a corresponding finger of the user. In this case, the mobile telephone, which is one example of the data processing device, (i) comprises a vein scanner for reading the vein pattern in place of the fingerprint sensor, and (ii) in accordance with a user operation, stores therein a table in which vein patterns of respective fingers are associated one-to-one with different applications. With the above structure, an application can be activated in accordance with a vein pattern of a corresponding finger of the user.

(11) It has been described in the above embodiments that at the time of judgment by the judgment subunit 703, information for identifying an application to be activated is displayed on the LCD when the authenticated fingerprint data matches one of stored pieces of fingerprint data at a predetermined match rate (e.g., 80%) or more. Alternatively, the application to be activated may be executed without displaying such information.

(12) It has been described in the above embodiments that an application is executed by using a designated character string and a result of the execution is displayed on the LCD. Alternatively, the result of the execution may be notified to the user via, for example, audio output.

(13) It has been described in the above embodiments that in the fingerprint-application correspondence table, pieces of fingerprint data of the user's fingers are associated one-to-one with different applications. Alternatively, in the fingerprint-application correspondence table, a combination of pieces of fingerprint data of the user's fingers may be associated with one application (one example of such a combination is a combination of fingerprint data of a right index finger and fingerprint data of a right middle finger). In this case, the fingerprint sensor reads fingerprints of a plurality of fingers within a predetermined time period and generates pieces of fingerprint data of the respective fingers. Then, the judgment subunit compares the generated pieces of fingerprint data with each of the stored combinations of pieces of fingerprint data of the user's fingers. With the above structure, more applications can be associated one-to-one with pieces of fingerprint data.

(14) It has been described in the above Embodiment 2 that the touchscreen 500A detects a touch made to the upper region. Alternatively, the touchscreen 500A may detect a touch made to the lower region. In this case, when a selection operation for selecting a predetermined character string displayed on the lower region is made, the application execution subunit 705 may execute an application that was activated first (an application displayed on the upper region) by using the predetermined character string as data input by the user to this application.

Alternatively, the application that was activated first may be displayed on the lower region, and the application that was activated second may be displayed on the upper region. Alternatively, the split screen display may be performed on a screen that is visually split into left and right regions. Furthermore, in a device comprising two LCD screens, the application that was activated first may be displayed on one of the two LCD screens, and the application that was activated second may be displayed on the other.

(15) It has been described in the above Embodiment 2 that when the judgment in step S1003 indicates that the mail application has not been activated yet, the mail application is not newly activated. Alternatively, the mail application may be activated. At this time, a default screen for the newly activated mail application may be displayed together with the screens for the two applications that have already been activated in the form of split screen display—i.e., on three regions of the LCD.

(16) In steps S705 and S713 of the above Embodiment 2, the judgment is made as to whether or not a touch made by the user is the operation for executing the activated application by judging whether or not the user has performed an operation with respect to a menu for executing the application. Alternatively, the judgment as to whether or not a touch made by the user is the operation for executing the activated application may be made by judging whether or not a time period for which the touch is being made is shorter than or equal to a predetermined period of time. In a case where an application is activated in accordance with a fingerprint, the user's finger must keep touching the touchscreen 500A for a time period required to read the fingerprint. Accordingly, the judgment as to whether or not a touch made by the user is the operation for executing the activated application can be made by, for example, judging whether or not the time period during which the user's finger keeps touching the touchscreen 500A is shorter than or equal to the time period required to read the fingerprint. In this case, reading of the fingerprint in step S704 may be performed when the judgment in the step S705 is negative (the NO branch of step S705). With the above structure, the fingerprint reading is not performed each time the touch is detected; instead, the fingerprint reading is performed only when an application is to be activated in accordance with a fingerprint. The above structure can therefore reduce the processing load.

(17) It has been described in the above Embodiment 2 that in a case where two applications are displayed in the form of split screen display, if an operation with respect to the application displayed on the upper region is performed using a finger that is different from a finger pertaining to the fingerprint data associated with the application displayed on the lower region, then the application displayed on the upper region may be executed based on this operation with the luminance of the lower region reduced. Furthermore, if an operation with respect to the application displayed on the upper region is performed using the finger pertaining to the fingerprint data associated with the application displayed on the lower region, then the luminance of the display regions for the respective applications may be both increased.

(18) For example, when the mail application has not been activated yet, if an operation with respect to the application displayed on the upper region is performed using a right thumb associated with the mail application in step S1003, then the screen displayed on the lower region may be updated by activating the mail application in accordance with the fingerprint data of the right thumb and displaying a default screen for the mail application on the lower region.

(19) It has been described in the above Embodiment 2 that when the judgment in step S1003 indicates that the mail application has not been activated yet (the NO branch of step S1003), the processing moves to step S711. Alternatively, the processing may move to step S1001 after displaying an error notification indicating that the authenticated fingerprint data is not associated with the operations of the application currently being displayed and receiving input of a fingerprint from the user again. The same goes for the cases where the judgment in steps S1011 and S1017 is negative.

(20) Examples of the jobs recited in Claim 1 and the like include: applications per se (e.g., the mail application, map application and video application illustrated in FIG. 2); subroutines that are constituent elements of a single application (e.g., the reply mail creation function and received mail search function illustrated in FIG. 9); and the like.

(21) As described above, with the data processing device pertaining to the present invention, the user of the data processing device performs an operation for selecting target data from among pieces of data being displayed on a display unit. Once a generation unit has read biometric information of his/her finger associated with a desired job, the selected target data is used as data input by the user to the desired job, and a result of execution of the desired job can be obtained. The above structure does not require cumbersome operations (e.g. separately inputting search criteria) upon execution of the job, thus improving the user-friendliness of the data processing device.

Any combination of the above embodiments and supplementary notes is applicable.

INDUSTRIAL APPLICABILITY

The present invention is widely applicable to data processing devices with biometric authentication functions, such as mobile telephones.

REFERENCE SIGNS LIST 10 mobile telephone
100 antenna
200 wireless communication unit
300 fingerprint sensor
400 display unit
500 touchscreen
600 storage unit
700 control unit
701 registration subunit
702 designation subunit
703 judgment subunit
704 notification control subunit
705 application execution subunit
706 fingerprint data generation subunit

The invention claimed is:

1. A data processing device comprising:
a storage unit storing therein a correspondence table in which biometric data pieces are associated one-to-one with different jobs, the biometric data pieces pertaining to respective fingers of a user, wherein each of the different jobs comprises execution of an application;
a display unit;
a touchscreen covering a display region of the display unit;
a designation unit operable to, in accordance with a user operation, designate a target data piece from among data pieces being displayed on the display unit in accordance with a user operation on the touchscreen;
a generation unit operable to generate a biometric data piece by reading a biometric information piece of a finger of the user when the user operation is performed on the touchscreen; and
an execution unit operable to execute one of the different jobs that is associated with one of the stored biometric data pieces that matches the generated biometric data piece by using the target data piece as data input by the user with respect to the one of the different jobs,
wherein the execution unit splits the display region of the display unit into two or more sub-regions, displays data obtained by executing a first application on a first sub-region among the two or more sub-regions, and displays data obtained by executing a second application on a second sub-region among the two or more sub-regions,
wherein, when the user operation designating the target data piece is performed on a region of the touchscreen corresponding to the first sub-region, if a biometric data piece generated by the generation unit when the user operation is performed matches one of the stored biometric data pieces which is associated with the second application, the execution unit executes designation processing in the second application with the target data piece designated by the user operation as a target and displays a result of the designation processing on the second sub-region, and
wherein, when a user operation is performed on a region of the touchscreen corresponding to the first sub-region, if a biometric data piece generated by the generation unit when the user operation is performed matches one of the stored biometric data pieces which is associated with an application other than the second application, the execution unit executes the first application using the user operation as an operation pertaining to the first application.

2. The data processing device of claim 1, wherein the touchscreen is operable to detect position information indicating a position pressed by the user on the touchscreen, wherein the designation unit designates a part of the data pieces being displayed on the display unit as the target data piece in accordance with the detected position information, the part corresponding to the position indicated by the detected position information.

3. The data processing device of claim 2, wherein the execution unit includes:
a judgment subunit operable to judge whether or not one of the stored biometric data pieces matches the generated biometric data piece; and
a notification subunit operable to, when the judgment subunit judges affirmatively, notify the user of information for identifying one of the different jobs that is associated with the one of the stored biometric data pieces that is judged to match the generated biometric data piece, via image display or audio output.

4. The data processing device of claim 3, wherein the one of the stored biometric data pieces is judged to match the generated biometric data piece when a match rate therebetween is higher than or equal to a predetermined match rate, and the notification subunit notifies the user of the information for identifying the one of the different jobs that is associated with the one of the stored biometric data pieces when the judgment subunit judges that the one of the stored biometric data pieces matches the generated biometric data piece at the match rate higher than or equal to the predetermined match rate.

5. The data processing device of claim 2, wherein the execution unit splits a display region of the display unit into two sub-regions, displays data obtained by executing the one of the different jobs on one of the two sub-regions, and displays the data pieces that had been displayed on the display unit until the splitting of the display region on the other.

6. The data processing device of claim 1, wherein executing one of the different jobs that is associated with one of the stored biometric data pieces that matches the generated biometric data piece by using the target data piece as data input by the user with respect to the one of the different jobs comprises:

generating a mail creation screen;
inserting the target data piece into a body of a mail on the mail creation screen; and
displaying the mail creation screen.

7. The data processing device of claim 1, wherein executing one of the different jobs that is associated with one of the stored biometric data pieces that matches the generated biometric data piece by using the target data piece as data input by the user with respect to the one of the different jobs comprises:
performing a search in the one of the different jobs using the target data piece in a search query; and
displaying results of the search in the one of the different jobs.

8. The data processing device of claim 7, wherein the one of the different jobs comprises a map application and the target data piece comprises an identification of a geographic location.

9. The data processing device of claim 7, wherein the one of the different jobs comprises a video application and the target data piece comprises a character string.

10. The data processing device of claim 1, wherein the designation unit designates the target data piece after the generation unit generates the biometric data piece.

11. The data processing device of claim 1, wherein the target data piece comprises a character string, and wherein, based on position information detected by the touchscreen in response to the user performing a sliding operation on the touchscreen, in which a finger is run over a character string displayed on the display unit, the designation unit designates, as the target data piece from among the data pieces being displayed on the display unit, a character string corresponding to a position indicated by the position information.

12. A non-transitory computer-readable medium having stored thereon an executable data processing program that, when executed:
in accordance with a user operation on a touchscreen that covers a display region of a display unit, designates a target data piece from among data pieces being displayed on the display unit, wherein the display region of the display unit is split into two or more sub-regions;
displays data obtained by executing a first application on a first sub-region among the two or more sub-regions;
displays data obtained by executing a second application on a second sub-region among the two or more sub-regions;
generates a biometric data piece by reading a biometric information piece of a finger of a user when the user operation is performed on the touchscreen;
with reference to a correspondence table which is stored in a storage unit and in which biometric data pieces are associated one-to-one with different jobs that each comprise execution of an application, judges whether or not one of the stored biometric data pieces matches the generated biometric data piece, the stored biometric data pieces pertaining to respective fingers of the user; and,
when the judgment is affirmative, executes one of the different jobs that is associated with the one of the stored biometric data pieces that matches the generated biometric data piece by using the target data piece as data input by the user with respect to the one of the different jobs,
wherein, when the user operation designating the target data piece is performed on a region of the touchscreen corresponding to the first sub-region, if a generated biometric data piece when the user operation is performed matches one of the stored biometric data pieces which is associated with the second application, the executable data processing program executes designation processing in the second application with the target data piece designated by the user operation as a target and displays a result of the designation processing on the second sub-region, and
wherein, when a user operation is performed on a region of the touchscreen corresponding to the first sub-region, if a biometric data piece generated by the generation unit when the user operation is performed matches one of the stored biometric data pieces which is associated with an application other than the second application, the executable data processing program executes the first application using the user operation as an operation pertaining to the first application.

13. A data processing device comprising:
a touchscreen covering a display region;
a storage unit storing therein biometric information pieces of a user and a plurality of jobs, in one-to-one association, wherein each of the plurality of jobs comprises execution of an application;
a generation unit operable to generate a biometric data piece by reading a biometric information piece of the user via the touchscreen when a user operation is performed on the touchscreen;
an execution unit operable to, when the generation unit generates the biometric data piece, execute one of the jobs that is associated with the generated biometric data piece; and
a designation unit operable to, in accordance with a user operation, designate a target data piece from among data pieces being displayed on the touchscreen in accordance with the user operation performed on the touchscreen, wherein when the target data piece is designated upon execution of the one of the jobs, the execution unit executes the one of the jobs by using the target data piece as data input by the user with respect to the one of the jobs,
wherein the execution unit splits the display region into two or more sub-regions, displays data obtained by executing a first application on a first sub-region among the two or more sub-regions, and displays data obtained by executing a second application on a second sub-region among the two or more sub-regions,
wherein, when the user operation designating the target data piece is performed on a region of the touchscreen corresponding to the first sub-region, if a biometric data piece generated by the generation unit when the user operation is performed matches one of the stored biometric information pieces which is associated with the second application, the execution unit executes designation processing in the second application with the target data piece designated by the user operation as a target and displays a result of the designation processing on the second sub-region, and
wherein, when a user operation is performed on a region of the touchscreen corresponding to the first sub-region, if a biometric data piece generated by the generation unit when the user operation is performed matches one of the stored biometric information pieces which is associated with an application other than the second application, the execution unit executes the first application using the user operation as an operation pertaining to the first application.

14. The data processing device of claim 13, wherein when the target data piece is not designated upon execution of the one of the jobs, the execution unit (i) splits a display region of the touchscreen into a plurality of sub-regions including a first sub-region and a second sub-region, (ii) displays data associated with the one of the jobs on the first sub-region, and (iii) displays data pieces associated with another one of the jobs that had been executed until the execution of the one of the jobs on the second sub-region.

15. The data processing device of claim 14, wherein upon designation of a target data piece from among the data pieces being displayed on the second sub-region, when a biometric data piece obtained through the designation of the target data piece matches one of the biometric information pieces that is associated with the one of the jobs executed and displayed on the first sub-region, the execution unit executes the one of the jobs by using the designated target data piece as data input by the user with respect to the one of the jobs.

* * * * *